US011438916B2

(12) United States Patent
Rico Alvarino et al.

(10) Patent No.: US 11,438,916 B2
(45) Date of Patent: *Sep. 6, 2022

(54) SOUNDING REFERENCE SIGNAL TRIGGERING FOR ENHANCED CARRIER AGGREGATION

(71) Applicant: QUALCOMM Incorporated, San Diego, CA (US)

(72) Inventors: Alberto Rico Alvarino, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/921,659

(22) Filed: Jul. 6, 2020

(65) Prior Publication Data

US 2020/0337066 A1 Oct. 22, 2020

Related U.S. Application Data

(63) Continuation of application No. 15/474,840, filed on Mar. 30, 2017, now Pat. No. 10,716,125.

(Continued)

(51) Int. Cl.
*H04W 72/12* (2009.01)
*H04L 5/00* (2006.01)
(Continued)

(52) U.S. Cl.
CPC ......... *H04W 72/1247* (2013.01); *H04L 5/001* (2013.01); *H04L 5/0048* (2013.01);
(Continued)

(58) Field of Classification Search
CPC ..... H04L 5/001; H04L 5/0048; H04L 5/0051; H04W 52/325; H04W 72/042; H04W 72/0453; H04W 72/1247; H04W 72/1268
See application file for complete search history.

(56) References Cited

U.S. PATENT DOCUMENTS 10,270,570 B2 4/2019 Liu et al.
10,716,125 B2 7/2020 Rico Alvarino et al.
(Continued)

FOREIGN PATENT DOCUMENTS

CN 101765134 A 6/2010
CN 102377532 A 3/2012
(Continued)

OTHER PUBLICATIONS

LG Electronics: "Details on Dynamic Aperiodic Sounding for LTE-Advanced", 3GPP TSG RAN WG1 Meeting #62, R1-104776, Madrid, Spain, Aug. 23-27, 2010, 4 Pages.
(Continued)

*Primary Examiner* — Zhensheng Zhang
(74) *Attorney, Agent, or Firm* — Holland & Hart LLP/Qualcomm

(57) ABSTRACT

Methods, systems, and devices for wireless communication are described. A method at a user equipment (UE) includes receiving signaling that indicates a carrier aggregation (CA) configuration (having carriers configured for UL and downlink (DL) data transmissions) and an auxiliary uplink (UL) configuration (having carriers configured for UL reference signal transmissions). The method also includes receiving a resource assignment on a DL carrier of the CA configuration, and transmitting an aperiodic sounding reference signal (A-SRS) using the one or more carriers of the auxiliary UL configuration based at least in part on the received resource assignment. Another method is performed by a UE having a CA configuration and an A-SRS configuration, including receiving a resource assignment on a DL carrier in the CA configuration, detecting a trigger for transmitting an A-SRS, determining UL resources of the A-SRS configuration for transmitting the A-SRS, and transmitting the A-SRS on the determined UL resources.

37 Claims, 22 Drawing Sheets

Related U.S. Application Data

(60) Provisional application No. 62/317,465, filed on Apr. 1, 2016.

(51) Int. Cl.
    *H04W 52/32*     (2009.01)
    *H04W 72/04*     (2009.01)

(52) U.S. Cl.
    CPc ......... *H04L 5/0051* (2013.01); *H04W 52/325* (2013.01); *H04W 72/042* (2013.01); *H04W 72/0453* (2013.01); *H04W 72/1268* (2013.01)

(56) References Cited

U.S. PATENT DOCUMENTS

| | | | |
|---|---|---|---|
| 2005/0276385 A1* | 12/2005 | McCormick | H04L 41/069 379/1.02 |
| 2012/0263129 A1 | 10/2012 | Noh et al. | |
| 2013/0010659 A1 | 1/2013 | Chen et al. | |
| 2013/0128855 A1 | 5/2013 | Noh et al. | |
| 2013/0156014 A1 | 6/2013 | Kim et al. | |
| 2013/0215811 A1 | 8/2013 | Takaoka et al. | |
| 2014/0036859 A1 | 2/2014 | Ekpenyong et al. | |
| 2015/0016317 A1 | 1/2015 | Park et al. | |
| 2015/0215095 A1 | 7/2015 | Ahn et al. | |
| 2015/0245347 A1 | 8/2015 | Yi et al. | |
| 2015/0334695 A1* | 11/2015 | Kim | H04W 72/0413 370/329 |
| 2017/0265212 A1* | 9/2017 | Zhang | H04W 72/1268 |
| 2017/0290041 A1 | 10/2017 | Rico et al. | |

FOREIGN PATENT DOCUMENTS

| | | |
|---|---|---|
| KR | 20120080492 A | 7/2012 |
| WO | WO-2012093911 A2 | 7/2012 |

OTHER PUBLICATIONS

ZTE: "On Dynamic Aperiodic SRS in LTE-A", 3GPP TSG-RAN WG1#61bis, R1-103604, Dresden, Germany, Jun. 28-Jul. 2, 2010, 4 pages.

ZTE: "On Dynamic Aperiodic SRS in LTE-A",3GPP TSG-RAN WG1#62, R1-104676, Madrid, Spain, Aug. 23-27, 2010, 5 pages.

Huawei, et al., "New WI Proposal: SRS Carrier Based Switching for LTE", RP-160676, revision of RP-160639, 3GPP TSG RAN Meeting #71, Goteborg, Sweden, Mar. 7-10, 2016, 7 Pages.

International Search Report and Written Opinion—PCT/US2017/025281—ISA/EPO—dated Jun. 29, 2017.

LG Electronics, "SRS Transmission Handling for Rel-13 CA," 3GPP TSG RAN WG1 Meeting #82, R1-154251, Beijing, China, Aug. 24-28, 2015, 3 pgs., XP051001582, 3rd Generation Partnership Project.

Qualcomm Incorporated, "Specification Impact of Supporting SRS Switching," 3GPP TSG RAN WG1 Meeting #84bis, R1-163055, Busan, Korea, Apr. 11-15, 2016, 2 pgs., XP051080499, 3rd Generation Partnership Project.

Huawei: "Issues on Cross-Carrier PDCCH Indication for Carrier Aggregation", 3GPP Draft, 3GPP TSG RAN WG1 meeting #58, R1-093047 Issues ON Cross-Carrier PDCCH Indication for Carrier Aggregation, 3rd Generation Partnership Project (3GPP), Mobile Competence Centre; 650, Route Des Lucioles; F-06921, Sophia-Antipolis Cedex; France, No. Shenzhen, China, Aug. 24-28, 2009, Aug. 18, 2009, Aug. 18, 2009 (Aug. 18, 2009), XP050351439, 6 pages, [retrieved on Aug. 18, 2009].

European Search Report—EP21215803—Search Authority—The Hague—dated Feb. 25, 2022.

Spirent Communications: "LTE-Advanced Carrier Aggregation and its Significance to Mobile Device Testing," Telecom Network Technologies No. 4, Apr. 30, 2014, pp. 69-80, the whole document.

* cited by examiner

SOUNDING REFERENCE SIGNAL TRIGGERING FOR ENHANCED CARRIER AGGREGATION

CROSS REFERENCES

The present application for patent is a Continuation of U.S. patent application Ser. No. 15/474,840 by Rico Alvarino, et al., entitled "Sounding Reference Signal Triggering For Enhanced Carrier Aggregation" filed Mar. 30, 2017, which claims priority to U.S. Provisional Patent Application No. 62/317,465 by Rico Alvarino, et al., entitled "Sounding Reference Signal Triggering For enhanced Carrier Aggregation," filed Apr. 1, 2016, assigned to the assignee hereof.

BACKGROUND

The following relates generally to wireless communication, and more specifically to sounding reference signal (SRS) triggering for enhanced carrier aggregation (eCA).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as a user equipment (UE).

A wireless communication system may support multiple component carriers (CCs) in a carrier aggregation (CA) or enhanced carrier aggregation (ECA or eCA) configuration. CCs may be configured for uplink (UL) and downlink (DL) communication between a base station and a UE. A UE may transmit reference signals (e.g., sounding reference signals (SRS)) to indicate the quality of a frequency channel used for communication with a base station. Other, unconfigured UL CCs could possibly be used for SRS transmissions, but aperiodic SRS transmissions are typically triggered with a grant of UL resources for data transmissions on the same CC as the SRS.

SUMMARY

Methods, systems, and devices for wireless communication that support aperiodic sounding reference signal (A-SRS) triggering for enhanced carrier aggregation (eCA). A user equipment (UE) may receive signaling that indicates a carrier aggregation (CA) configuration (having carriers configured for UL and DL data transmissions) and an auxiliary UL configuration (having carriers configured for UL reference signal transmissions). A resource assignment on a DL carrier of the CA configuration may be received, and the UE may transmit an A-SRS using the one or more carriers of the auxiliary UL configuration based at least in part on the received resource assignment.

A base station may transmit signaling that indicates a CA configuration and an auxiliary UL configuration for a UE. The CA configuration may have carriers configured for UL and DL data transmissions, and the auxiliary UL configuration may have carriers configured for UL reference signal transmissions. The base station then transmits a resource assignment on a DL carrier to the one or more carriers of the CA configuration, and receives back from the UE an A-SRS in the one or more carriers of the auxiliary UL configuration in response to the transmitted resource assignment. A UE may also have a CA configuration and an A-SRS configuration, and receive a resource assignment on a DL carrier in the CA configuration, detect a trigger for transmitting an A-SRS, determine UL resources of the A-SRS configuration for transmitting the A-SRS, and transmit the A-SRS on the determined UL resources.

A method of wireless communication is described. The method may include identifying a carrier aggregation (CA) configuration and an aperiodic sounding reference signal (A-SRS) configuration of the UE, wherein the A-SRS configuration comprises one or more component carriers (CCs) on which the UE does not perform uplink (UL) data transmissions, receiving a resource assignment on a downlink (DL) CC in the CA configuration, detecting a trigger for transmitting one or more A-SRS transmissions based at least in part on a downlink control information (DCI) format of the resource assignment, determining one or more CCs of the A-SRS configuration for transmitting the one or more A-SRS transmissions based at least in part on the DCI format of the resource assignment, and transmitting the one or more A-SRS transmissions on the one or more determined CCs of the A-SRS configuration.

An apparatus for wireless communication is described. The apparatus may include means for identifying a carrier aggregation (CA) configuration and an aperiodic sounding reference signal (A-SRS) configuration of the UE, wherein the A-SRS configuration comprises one or more component carriers (CCs) on which the UE does not perform uplink (UL) data transmissions, means for receiving a resource assignment on a downlink (DL) CC in the CA configuration, means for detecting a trigger for transmitting one or more A-SRS transmissions based at least in part on a downlink control information (DCI) format of the resource assignment, means for determining one or more CCs of the A-SRS configuration for transmitting the one or more A-SRS transmissions based at least in part on the DCI format of the resource assignment, and means for transmitting the one or more A-SRS transmissions on the one or more determined CCs of the A-SRS configuration.

Another apparatus for wireless communication is described. The apparatus may include a processor, memory in electronic communication with the processor, and instructions stored in the memory. The instructions may be operable to cause the processor to identify a carrier aggregation (CA) configuration and an aperiodic sounding reference signal (A-SRS) configuration of the UE, wherein the A-SRS configuration comprises one or more component carriers (CCs) on which the UE does not perform uplink (UL) data transmissions, receive a resource assignment on a downlink (DL) CC in the CA configuration, detect a trigger for transmitting one or more A-SRS transmissions based at least in part on a downlink control information (DCI) format of the resource assignment, determine one or more CCs of the A-SRS configuration for transmitting the one or more A-SRS transmissions based at least in part on the DCI format of the resource assignment, and transmit the one or more A-SRS transmissions on the one or more determined CCs of the A-SRS configuration.

A non-transitory computer readable medium for wireless communication is described. The non-transitory computer-readable medium may include instructions operable to cause a processor to identify a carrier aggregation (CA) configuration and an aperiodic sounding reference signal (A-SRS) configuration of the UE, wherein the A-SRS configuration comprises one or more component carriers (CCs) on which the UE does not perform uplink (UL) data transmissions, receive a resource assignment on a downlink (DL) CC in the CA configuration, detect a trigger for transmitting one or more A-SRS transmissions based at least in part on a downlink control information (DCI) format of the resource assignment, determine one or more CCs of the A-SRS configuration for transmitting the one or more A-SRS transmissions based at least in part on the DCI format of the resource assignment, and transmit the one or more A-SRS transmissions on the one or more determined CCs of the A-SRS configuration.

In some examples of the method, apparatus, and non-transitory computer-readable medium described above, one or more of the CCs of the A-SRS configuration comprise one or more auxiliary UL CCs, the one or more auxiliary UL CCs being configured for UL reference signal transmissions and not configured for UL data transmissions.

In some examples of the method, apparatus, and non-transitory computer-readable medium described above, receiving the resource assignment comprises: identifying power control information in a field of the DCI format that indicates an A-SRS transmitter power control (TPC) command, wherein the one or more A-SRS transmissions may be transmitted using a transmit power based at least in part on the power control information.

Some examples of the method, apparatus, and non-transitory computer-readable medium described above may further include processes, features, means, or instructions for identifying the one or more CCs of the A-SRS configuration based at least in part on a plurality of bits of the resource assignment configured according to the DCI format.

In some examples of the method, apparatus, and non-transitory computer-readable medium described above, the resource assignment comprises a sounding reference signal radio network temporary identifier (SRS-RNTI), wherein the SRS-RNTI triggers a plurality of A-SRS transmissions in a plurality of UL resources of the A-SRS configuration.

Some examples of the method, apparatus, and non-transitory computer-readable medium described above may further include processes, features, means, or instructions for identifying additional uplink transmissions to be transmitted simultaneously with the one or more A-SRS transmissions. Some examples of the method, apparatus, and non-transitory computer-readable medium described above may further include processes, features, means, or instructions for determining whether to transmit the additional uplink transmissions or the one or more A-SRS transmissions, or both, based at least in part on a prioritization.

Some examples of the method, apparatus, and non-transitory computer-readable medium described above may further include processes, features, means, or instructions for transmitting the one or more A-SRS transmissions may be based at least in part on determining to transmit the one or more A-SRS transmissions according to the prioritization.

Some examples of the method, apparatus, and non-transitory computer-readable medium described above may further include processes, features, means, or instructions for identifying additional uplink transmissions to be transmitted simultaneously with the one or more A-SRS transmissions. Some examples of the method, apparatus, and non-transitory computer-readable medium described above may further include processes, features, means, or instructions for transmitting the one or more A-SRS transmissions instead of the additional uplink transmissions, wherein the additional uplink transmissions comprise a physical uplink shared channel (PUSCH) transmission on one or more component carriers of the CA configuration.

In some examples of the method, apparatus, and non-transitory computer-readable medium described above, a DL carrier of the CA configuration and one of the one or more CCs of the A-SRS configuration share frequency resources.

A method of wireless communication is described. The method may include identifying a carrier aggregation (CA) configuration and an aperiodic sounding reference signal (A-SRS) configuration of one or more user equipments (UEs), wherein the A-SRS configuration comprises one or more component carriers (CCs) on which the one or more UEs do not perform uplink (UL) data transmissions, transmitting a resource assignment on a downlink (DL) CC in the CA configuration, the resource assignment comprising a trigger for one or more UEs to transmit one or more A-SRS transmissions based at least in part on a downlink control information (DCI) format of the resource assignment, wherein one or more CCs of the A-SRS configuration for transmitting the one or more A-SRS transmissions are identified based at least in part on the DCI format of the resource assignment, and receiving A-SRS transmissions from the one or more UEs on CCs identified by the DCI format.

An apparatus for wireless communication is described. The apparatus may include means for identifying a carrier aggregation (CA) configuration and an aperiodic sounding reference signal (A-SRS) configuration of one or more user equipments (UEs), wherein the A-SRS configuration comprises one or more component carriers (CCs) on which the one or more UEs do not perform uplink (UL) data transmissions, means for transmitting a resource assignment on a downlink (DL) CC in the CA configuration, the resource assignment comprising a trigger for one or more UEs to transmit one or more A-SRS transmissions based at least in part on a downlink control information (DCI) format of the resource assignment, wherein one or more CCs of the A-SRS configuration for transmitting the one or more A-SRS transmissions are identified based at least in part on the DCI format of the resource assignment, and means for receiving A-SRS transmissions from the one or more UEs on CCs identified by the DCI format.

Another apparatus for wireless communication is described. The apparatus may include a processor, memory in electronic communication with the processor, and instructions stored in the memory. The instructions may be operable to cause the processor to identify a carrier aggregation (CA) configuration and an aperiodic sounding reference signal (A-SRS) configuration of one or more user equipments (UEs), wherein the A-SRS configuration comprises one or more component carriers (CCs) on which the one or more UEs do not perform uplink (UL) data transmissions, transmit a resource assignment on a downlink (DL) CC in the CA configuration, the resource assignment comprising a trigger for one or more UEs to transmit one or more A-SRS transmissions based at least in part on a downlink control information (DCI) format of the resource assignment, wherein one or more CCs of the A-SRS configuration for transmitting the one or more A-SRS transmissions are identified based at least in part on the DCI format of the resource assignment, and receive A-SRS transmissions from the one or more UEs on CCs identified by the DCI format.

A non-transitory computer readable medium for wireless communication is described. The non-transitory computer-readable medium may include instructions operable to cause a processor to identify a carrier aggregation (CA) configuration and an aperiodic sounding reference signal (A-SRS) configuration of one or more user equipments (UEs), wherein the A-SRS configuration comprises one or more component carriers (CCs) on which the one or more UEs do not perform uplink (UL) data transmissions, transmit a resource assignment on a downlink (DL) CC in the CA configuration, the resource assignment comprising a trigger for one or more UEs to transmit one or more A-SRS transmissions based at least in part on a downlink control information (DCI) format of the resource assignment, wherein one or more CCs of the A-SRS configuration for transmitting the one or more A-SRS transmissions are identified based at least in part on the DCI format of the resource assignment, and receive A-SRS transmissions from the one or more UEs on CCs identified by the DCI format.

In some examples of the method, apparatus, and non-transitory computer-readable medium described above, the one or more CCs of the A-SRS configuration comprise one or more auxiliary UL CCs, the one or more auxiliary UL CCs being configured for UL reference signal transmissions and not configured for UL data transmissions.

Some examples of the method, apparatus, and non-transitory computer-readable medium described above may further include processes, features, means, or instructions for transmitting power control information in a field of the DCI format that indicates an A-SRS transmitter power control (TPC) command.

In some examples of the method, apparatus, and non-transitory computer-readable medium described above, the one or more CCs of the A-SRS configuration may be identified based at least in part on a plurality of bits of the resource assignment configured according to the DCI format.

In some examples of the method, apparatus, and non-transitory computer-readable medium described above, the resource assignment comprises a sounding reference signal radio network temporary identifier (SRS-RNTI), wherein the SRS-RNTI triggers a plurality of A-SRS transmissions in a plurality of UL resources of the A-SRS configuration.

In some examples of the method, apparatus, and non-transitory computer-readable medium described above, a DL carrier of the CA configuration and one of the one or more CCs of the A-SRS configuration share frequency resources.

In one embodiment, a device or system may include a processor, memory in electronic communication with the processor, instructions stored in the memory and operable, when executed by the processor, to cause the mobile device to: identify a carrier aggregation (CA) configuration and an aperiodic sounding reference signal (A-SRS) configuration of the mobile device, wherein the A-SRS configuration comprises one or more component carriers (CCs) on which the mobile device does not perform uplink (UL) data transmissions, receive a resource assignment on a downlink (DL) CC in the CA configuration, detect a trigger for transmitting one or more A-SRS transmissions based at least in part on a downlink control information (DCI) format of the resource assignment, determine one or more CCs of the A-SRS configuration for transmitting the one or more A-SRS transmissions based at least in part on the DCI format of the resource assignment, and transmit the one or more A-SRS transmissions on the one or more determined CCs of the A-SRS configuration.

Some examples of the device or system described above may also include one or more of the CCs of the A-SRS configuration comprise one or more auxiliary UL CCs, the one or more auxiliary UL CCs being configured for UL reference signal transmissions and not configured for UL data transmissions.

In some examples of the undefined described above, the instructions may be executable by the processor to cause the mobile device to: identify power control information in a field of the DCI format that indicates an A-SRS transmitter power control (TPC) command. Some examples of the system described above may also include transmitting the one or more A-SRS transmissions using a transmit power based at least in part on the power control information.

In some examples of the device or system described above, the instructions may be executable by the processor to cause the mobile device to: identify the one or more CCs of the A-SRS configuration based at least in part on a plurality of bits of the resource assignment configured according to the DCI format.

In some examples of the device or system described above, the resource assignment comprises a sounding reference signal radio network temporary identifier (SRS-RNTI), wherein the SRS-RNTI triggers a plurality of A-SRS transmissions in a plurality of UL resources of the A-SRS configuration.

In some examples of the device or system described above, the instructions may be executable by the processor to cause the mobile device to: identify additional uplink transmissions to be transmitted simultaneously with the one or more A-SRS transmissions. Some examples of the device or system described above may also include determining whether to transmit the additional uplink transmissions or the one or more A-SRS transmissions, or both, based at least in part on a prioritization.

In some examples of the undefined described above, the instructions may be executable by the processor to cause the mobile device to: transmit the one or more A-SRS transmissions based at least in part on determining to transmit the one or more A-SRS transmissions according to the prioritization.

In some examples of the device or system described above, the instructions may be executable by the processor to cause the mobile device to: identify additional uplink transmissions to be transmitted simultaneously with the one or more A-SRS transmissions. Some examples of the device or system described above may also include transmitting the one or more A-SRS transmissions instead of the additional uplink transmissions, wherein the additional uplink transmissions comprise a physical uplink shared channel (PUSCH) transmission on one or more component carriers of the CA configuration.

Some examples of the device or system described above may also include a DL carrier of the CA configuration and one of the one or more CCs of the A-SRS configuration share frequency resources.

In one embodiment, a device or system may include a processor, memory in electronic communication with the processor, instructions stored in the memory and operable, when executed by the processor, to cause the network device to: identify a carrier aggregation (CA) configuration and an aperiodic sounding reference signal (A-SRS) configuration of one or more user equipments (UEs), wherein the A-SRS configuration comprises one or more component carriers (CCs) on which the one or more UEs do not perform uplink (UL) data transmissions, transmit a resource assignment on a downlink CC in the CA configuration, the resource assignment comprising a trigger for one or more UEs to transmit one or more A-SRS transmissions based at least in part on a downlink control information (DCI) format of the resource assignment, wherein one or more CCs of the A-SRS configuration for transmitting the one or more A-SRS transmissions are identified based at least in part on the DCI format of the resource assignment, and receive A-SRS transmissions from the one or more UEs on CCs identified by the DCI format.

In some examples of the device or system described above, the one or more CCs of the A-SRS configuration comprise one or more auxiliary UL CCs, the one or more auxiliary UL CCs being configured for UL reference signal transmissions and not configured for UL data transmissions.

In some examples of the undefined described above, the instructions may be executable by the processor to cause the network device to: transmit power control information in a field of the DCI format that indicates an A-SRS transmitter power control (TPC) command.

In some examples of the device or system described above, the one or more CCs of the A-SRS configuration may be identified based at least in part on a plurality of bits of the resource assignment configured according to the DCI format.

In some examples of the device or system described above, the resource assignment comprises a sounding reference signal radio network temporary identifier (SRS-RNTI), wherein the SRS-RNTI triggers a plurality of A-SRS transmissions in a plurality of UL resources of the A-SRS configuration.

Some examples of the device or system described above may also include a DL carrier of the CA configuration and one of the one or more CCs of the A-SRS configuration share frequency resources.

DETAILED DESCRIPTION

Figure 1:
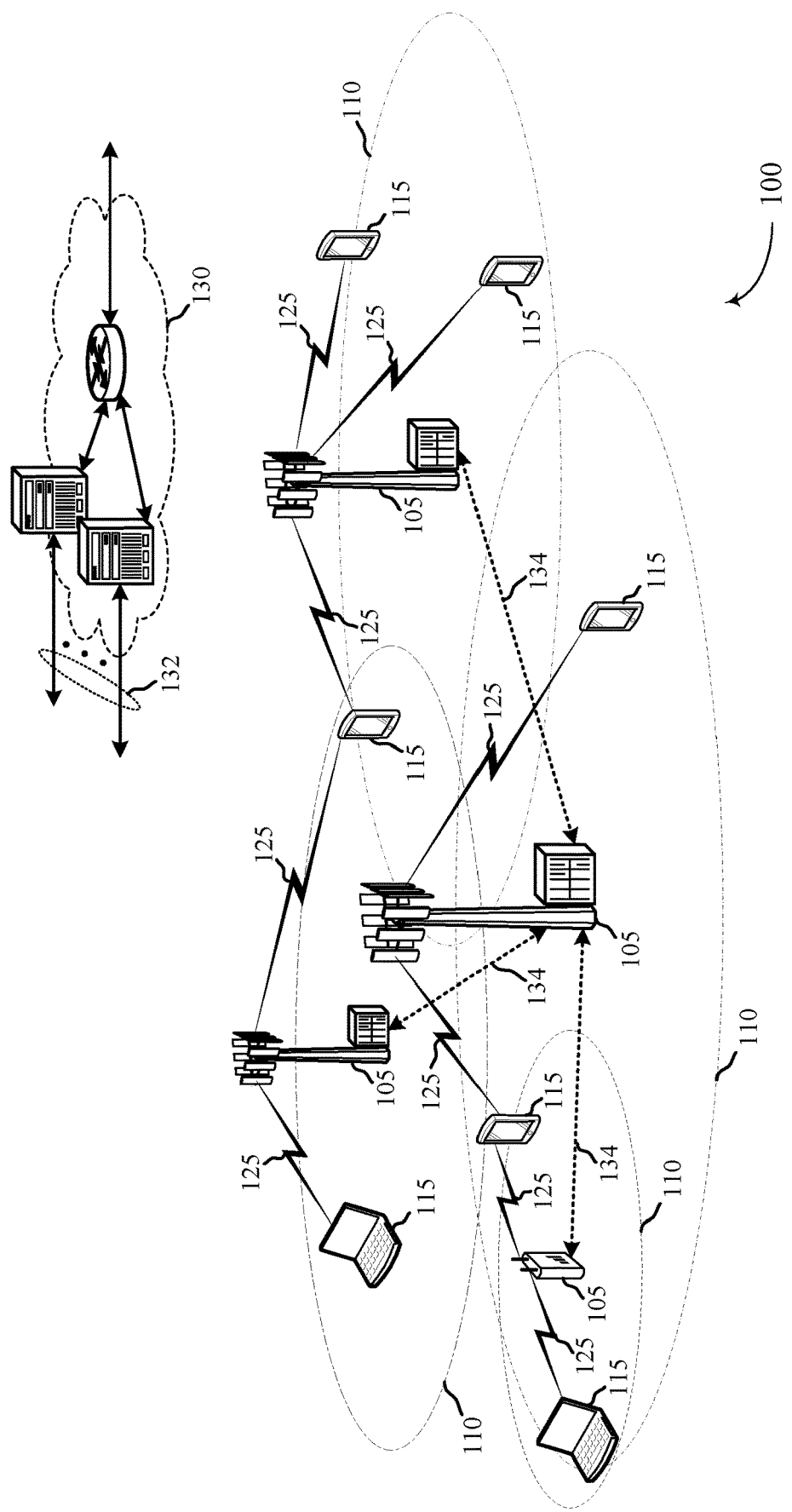
FIG. 1 illustrates an example of a wireless communications system that supports aperiodic sounding reference signal (A-SRS) triggering for enhanced carrier aggregation (eCA) in accordance with aspects of the present disclosure.

Aperiodic sounding reference signals (A-SRS) may be triggered on otherwise unconfigured UL CCs in grants for resources of other carriers or with specific requests for A-SRS on the UL CC. This may leverage a UE capability to transmit on multiple UL carriers and may provide additional opportunities for SRS transmission. This may address issues of inefficient resource allocation or other causes of reduced throughput.

For example, wireless communication systems may configure a portion of UL CCs that a UE is capable of supporting and may reserve sounding reference signals (SRS) transmissions for uplink CCs that are available for CA. This may result in an inaccurate estimation of channel conditions for bands that do not have an UL CC configured, which may cause inefficient use of the channel and reduced throughput. In some implementations of a wireless communications systems (e.g., legacy LTE), sounding reference signals (SRS) may be transmitted from a UE to a base station on an UL (e.g., to enable the base station to perform channel sounding). SRS may be transmitted periodically or aperiodically. For periodic SRS, a radio resource control (RRC) message may be received by the UE and indicate that a UE is to periodically transmit the periodic SRS to its serving base station (BS). For aperiodic SRS (A-SRS), an UL or DL grant may be sent by a serving BS to a UE to trigger the transmission of the A-SRS. However, while some DL control information (DCI) formats associated with legacy LTE may support a trigger of an A-SRS (e.g., DCI formats 1A, 2B, 2C, 2D), and UL DCI formats also support triggers for A-SRS (e.g., DCI formats 0, 4), other DCI formats do not, and in particular the other DCI formats for DL grants. Thus, even if a UE is configured by a base station to transmit an A-SRS on an UL CC to the BS, techniques to trigger the transmission of the A-SRS are needed for some DCI formats.

Furthermore, where a UE is configured to receive on multiple DL CCs (e.g., including one or more CCs dedicated for DL), but transmit on a small number (e.g., one) UL CCs, the UE may not monitor UL grants for the DL CCs, and in particular for those DL CCs that do not share their frequency with an UL CC (e.g. the dedicated DL CCs). Thus, the UE may not be able to rely on monitoring an UL grant to receive a trigger for an A-SRS. Triggering of A-SRS may be based on modified DL grants, modified UL grants, group triggers that are dedicated per UE of the group, and triggers that are dedicated per group of UEs. Each of these examples of triggering of A-SRS will be further discussed in detail below.

In other examples, where there are many DL CCs in a particular CA configuration, there may be collisions between multiple A-SRSs or between one or more A-SRSs and other UL signals to be transmitted on an UL CC (e.g., periodic SRS, PUSCH, PUCCH containing HARQ, PUCCH containing CSI feedback, dynamically-scheduled PUSCH, SPS PUSCH, etc.). Thus, a predetermined and/or configurable hierarchy of UL signals may be used to resolve such collisions.

Aspects of the disclosure introduced above are described below in the context of a wireless communication system. Aspects of the disclosure are further illustrated by and described with reference to apparatus diagrams, system diagrams, and flowcharts that relate to A-SRS triggering for eCA.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A sounding reference signal (SRS) may be transmitted by UE 115 using a predetermined sequence (e.g., a Zadoff-Chu sequence) so that a base station 105 may estimate the UL channel quality. An A-SRS transmission may not be associated with transmission of data on another channel, and may be transmitted periodically on a wide bandwidth (e.g., a bandwidth including more subcarriers than are allocated for UL data transmission). An SRS may also be scheduled on multiple antenna ports and may still be considered a single SRS transmission. An SRS transmission may be categorized as a Type 0 (periodically transmitted at equally spaced intervals) SRS or as a Type 1 (aperiodic) SRS. Thus, data gathered by a base station 105 from an SRS may be used to inform an UL scheduler. A base station 105 may also utilize an SRS to check timing alignment status and send time alignment commands to the UE 155-a.

A user equipment (UE) 115 may be configured with a number of component carriers (CCs) (e.g., up to 32 CCs) for carrier aggregation (CA). The CCs of a CA may be associated with one or several base stations 105. Each CC may be backward compatible and span a different frequency gap (e.g., up to 20 MHz). Multiple CCs configured for a UE 115 may span a maximum frequency region (e.g., up to 640 MHz). CCs in CA may be all frequency division duplex (FDD), all time division duplex (TDD), or a mixture of FDD and TDD. Different TDD CCs may have the same or different uplink (UL)/downlink (DL) configurations. In some cases, special subframes may be configured differently for different TDD CCs. One CC may be configured as the UE's primary CC (e.g., PCell or PCC) and other CCs may be configured as secondary CCs (e.g., SCell or SCC). The PCell may carry a physical uplink control channel (PUCCH). Some CCs may be on a licensed spectrum, while some other CCs may be on an unlicensed spectrum or a shared spectrum.

In some examples, UEs 115 may be configured with a large number of CCs (e.g., 20 or more CCs). This type of configuration may be referred to as enhanced CA (eCA). The term eCA may also refer to CA configurations that are enhanced relative to earlier deployments of CA-aggregation schemes. For example, use of auxiliary UL CCs or dynamically switching between CCs for certain transmissions may be examples of eCA. The terms CA and eCA may thus be used interchangeably to describe features related to multi-carrier configurations. In some cases, eCA may refer to CA in enhanced systems.

In some cases, a UE 115 may be served by cells from two or more base stations 105 that are connected by a non-ideal backhaul links 134 in dual connectivity operation. For example, the connection between the serving base stations 105 may not be sufficient to facilitate precise timing coordination. Thus, in some cases, the cells serving a UE 115 may be divided into multiple TAGs. In another example, one or more CCs may be connected with a one or more repeaters, while other CCs may be operated without a repeater. As a result, in some cases, the cells or different CCs serving a UE 115 may be divided into multiple TAGs. Each TAG may be associated with a different timing offset, such that the UE 115 may synchronize UL transmissions differently for different UL carriers.

In dual-connectivity, cells may be partitioned into two groups, the primary cell group (PCG) and the secondary cell group (SCG). Each group may have one or more cells in CA and may use a single cell to carry PUCCH. So in some cases, a UE may be configured with a PCell and another CC may be configured as the primary secondary CC (e.g., PSCell). A PSCell may also carry PUCCH (e.g., for the SCG) but may not include all of the attributes of the PCell. UL control information may be separately conveyed to each group via the PUCCH in each group. An SCG may also support semi-persistent scheduling (SPS) and scheduling requests (SRs). A UE 115 may additionally monitor a common search space in SCG.

In some cases, wireless communications system 100 may utilize enhanced component carriers. An eCC may be characterized by one or more features including: wider bandwidth, shorter symbol duration, shorter transmission time interval (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

In some implementations of a wireless communications systems 100 (e.g., legacy LTE), sounding reference signals (SRS) may be transmitted from a UE 115 to a base station 105 on an uplink (UL) (e.g., to enable the base station to perform channel sounding). SRS may be transmitted periodically or aperiodically. For aperiodic SRS (A-SRS), an UL or DL grant may be sent by a serving BS to a UE to trigger the transmission of the A-SRS. Triggering of A-SRS may be based on modified DL grants, modified UL grants, group triggers that are dedicated per UE of the group, and triggers that are dedicated per group of UEs. Each of these examples of triggering of A-SRS will be further discussed in detail below. In other examples, there may be collisions between multiple A-SRSs or between one or more A-SRSs and other UL signals to be transmitted on an UL CC (e.g., periodic SRS, PUSCH, PUCCH containing HARQ, PUCCH containing CSI feedback, dynamically-scheduled PUSCH, SPS PUSCH, etc.). Thus, a predetermined and/or configurable hierarchy of UL signals may be used to resolve such collisions.

Figure 2:
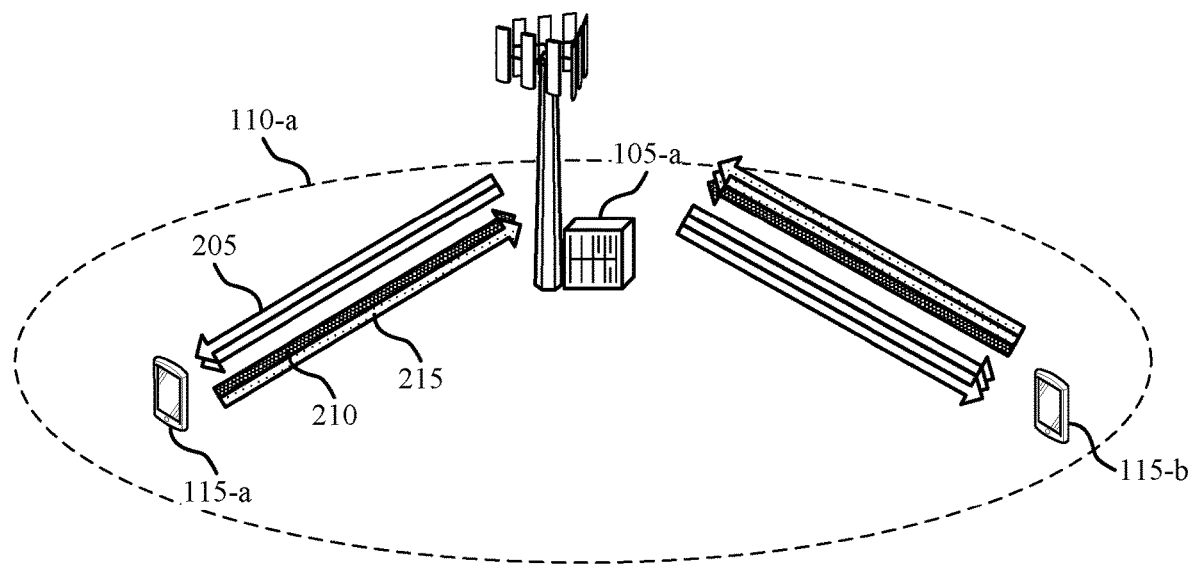
FIG. 2 illustrates an example of a wireless communications system that supports A-SRS triggering for eCA in accordance with aspects of the present disclosure.

FIG. 2 illustrates an example of a wireless communications system 200 for A-SRS triggering for CA. Wireless communications system 200 may include base station 105-*a* and UE 115-*a*, which may be examples of the corresponding devices described with reference to FIG. 1. Wireless communications system 200 represents a system that supports configuration of auxiliary UL CCs 215 for transmission of A-SRS. Configuration of auxiliary UL CCs 215 may be based on a UE's CC support capabilities in CA.

In some cases, a CA configuration may include more DL CCs 205 than UL CCs 210. This may be known as an asymmetric CA configuration. For example, a UE 115 (e.g., UE 115-*a*) may not transmit A-SRS for channel estimation of DL CCs 205 that do not have corresponding UL CCs. In such cases, the serving base station 105 (e.g., base station 105-*a*) may not be able to produce accurate channel estimates for all of the DL CCs 205. So, base station 105-*a* may configure UE 115-*a* with a number of auxiliary UL CCs 215 for transmission of A-SRS (e.g., corresponding to the number of DL CCs 205 that are not associated with an UL CC 210 of the CA configuration). This may enable more accurate channel estimation for each CC in the CA configuration and may improve the efficiency of the wireless communications system 200.

UE 115-*a* may transmit A-SRS on available resources of auxiliary UL CCs 215 which may otherwise not be configured for UL data transmissions. In some cases, a UE 115 may transmit using auxiliary UL CCs 215 in parallel (e.g., concurrently) with other UL CCs in a CA configuration (e.g., CA UL CC 210). UEs 115 that do not support parallel transmissions may transmit A-SRS on auxiliary UL CCs 215 with coordinated antenna switching, rate matching, or resource puncturing procedures, in various examples. In some cases, UE 115 may transmit on auxiliary UL CC 215 and UL CC 210 at different times, and may indicate a time or gap associated with tuning between the carriers. For example, a gap duration may be indicated to coordinate a time duration for switching to and from UL CCs with base station 105-*a* (e.g., time duration associated with switching between auxiliary UL CCs 215 and CA UL CCs 210).

Auxiliary UL CCs 215 may be configured and/or operated based on a UL CC capability of a UE 115. Different UEs 115 may have different capabilities in UL CA. For example, UE 115-*a* may be capable of two UL CCs (e.g., configured with one auxiliary UL CC 215 and one CA UL CC 210) and UE 115-*b* may be capable of using three UL CCs (e.g., configured with two auxiliary UL CCs 215 and one CA UL CC 210). UE capability may depend on the frequency band. That is, a UE 115 may be capable of UL CA for certain bands, but not capable of UL CA with other bands. A UE 115 that supports a CA configuration with a certain number of UL CCs (e.g., N CCs) may be configured with fewer than that number of CCs (e.g., less than N CCs). For example, UE 115-*a* may be capable of using UL CCs 210 in a CA configuration, but it may be configured with one UL CC 210 for the CA configuration.

By way of example, UE 115-*b* may be configured with three DL CCs 205 and one UL CC 210 for CA, even though UE 115-*b* may be capable of supporting a CA configuration with three UL CCs 210. In some examples, a UE 115-*b* may be limited to parallel transmissions based on a total number of configured UL CCs. For example, UE 115-*b* may be configured with a CA configuration that includes two UL CCs 210 and it may be configured with one auxiliary UL CC 215, and UE 115-*b* may be limited to concurrent transmission on two UL CCs during a single subframe. But in some cases, a UE 115-*b* may make parallel UL transmissions based on a total number of CCs UE 115-*b* supports. For example, UE 115-*b* may support a CA configuration with three UL CCs 210, and the UE 115-*b* may be configured with two UL CCs 210 and one auxiliary UL CC 215. In such case, UE 115-*b* may concurrently transmit on both UL CCs 210 and the auxiliary UL CC 215 during a single subframe.

For UEs 115 that are not capable of parallel transmissions for two or more CCs involved in switching, UL CCs may be configured based on the UL CCs symbol availability. Depending on the time required to switch from one CC to another CC, some symbols may be punctured or rate matched around to facilitate the switching (e.g., the first symbol of an UL subframe). For example, UE 115-*b* may switch from an auxiliary UL CC 215 (e.g., a CC configured for reference signal transmission) to a UL CC 210 (e.g., a CC configured for UL control and data transmissions). In such cases, in order to facilitate the switching, first symbol of a subframe used for transmission on the UL CC 210 may not be available for UL transmissions (e.g., PUSCH or PUCCH). Alternatively, UE 115-*b* may switch from a UL CC 210 to an auxiliary UL CC 215. This type of switching scenario may not affect other transmissions. For example, in a subframe used for A-SRS transmission on an auxiliary UL CC 215, there may be no other transmission in at least the first several symbols of that subframe. So there may be little or, no impact on the auxiliary UL CC 215.

The UE capability may affect the extent to which symbols used for other transmissions may be affected by switching between CCs. If a UE 115 is capable of fast switching, the UE 115 may switch between CCs without affecting other transmissions and so there may be no symbol designated for switching. Further, A-SRS symbol location may affect the extent to which transmission in other symbols may be impacted. For example, if an A-SRS is not located in the last symbol or the last set of symbols of a subframe, other symbols may not be affected due to a UE 115 switching between CCs. Therefore it may be unnecessary for wireless communication system 200 to facilitate switching impacts on specific symbols.

In some cases, a UE 115 may indicate certain requirements or preferences for scheduling to accommodate switching. For example, a UE 115 may signal a time duration or gap during which a UE 115 needs or preferably has to switch from one CC to another. The gap may depend on the frequency bands of the CCs between which the UE 115 is switching. By way of example, for inter-band switching, a UE 115 may signal for a certain band combination whether a short or long gap is used for switching (e.g., one bit per band or one bit per band combination). Additionally or alternatively, for intra-band switching, signaling may include one bit to indicate a long or a short gap for switching within the band. In some examples, an additional bit, which may be called a "learning capability bit," may further be used. For instance, if a UE 115 is capable, a long gap may be utilized for a certain band or within a band, after which a short gap may then be used for switching. The UE 115 may indicate this capability to base station 105 using the "learning capability bit."

Wireless communications system 200 may also support PRACH transmission on auxiliary UL CCs 215 (e.g., in order to obtain UL timing for auxiliary UL CCs 215). Instead of contention based PRACH, non-contention based PRACH may be supported and may be triggered via downlink control information from a PCell or a PSCell. For example, wireless communications system 200 may support PRACH on auxiliary UL CCs 215, particularly when the UE 115 is configured with two or more timing advance groups (TAGs). Auxiliary UL CCs 215 and UL CCs 210 of a CA configuration may be associated with different TAGs, in which case, different UL timing for auxiliary UL CCs 215 may be used. In such cases, different UL timing may allow A-SRS transmissions to be orthogonal to UL transmissions from other UEs 115 on the same CC.

In other examples, such as those employing dual-connectivity, switching for A-SRS transmissions may apply to each group of carriers configured for dual-connectivity. The configuration of one or more auxiliary UL CCs 215 may be separately configured for each group. For example, a PCG may have no auxiliary UL CC 215 configured, while an SCG may be configured with one auxiliary UL CC 215. A similar scheme may be employed in CA if two PUCCH groups are configured.

In one example, the transmission of A-SRS in auxiliary UL CC 215 may be triggered based on a DL grant received on DL CC 205. Depending on the transmission mode, the DL grant may be transmitted on the DL CC 205 according to a number of different DCI formats. In some examples, each DL grant for each transmission mode may include one or more bits to trigger the transmission of an A-SRS signal in auxiliary UL CC 215. For example, one bit in each of the DCI formats may indicate whether the DL grant refers to a DL CC that shares its frequency resources with an UL CC (e.g., the DL CC and the UL CC are paired CCs), or whether the DL refers to a DL CC that does not share its frequency resources with an UL CC (e.g., the DL CC and the UL CC are unpaired CCs). The bit may be a part of an A-SRS request field (e.g., SRS or A-SRS trigger field). In some examples, a new bit or bits may be added to each of the DCI formats to convey the indication. In other examples, an existing bit may be repurposed for such indication. In some examples, a combination of bits may be added and repurposed for the various DCI formats. A UE 115 that receives a DL grant in the DCI format may then determine whether an A-SRS should be transmitted to the requesting base station 105, for example in auxiliary UL CC 215.

According to other examples, resources of auxiliary UL CC 215 may be selected (from among a set of available resources available for transmission of A-SRSs) for transmission of an A-SRS based at least in part on the DCI format associated with the DL grant. For example, if a first DL grant is received in a first DCI format (e.g., DCI format 1A) at a first time, first resources (e.g., one or more resource blocks) of auxiliary UL CC 215 may be used to send the A-SRS; if a second DL grant is later received in a different DCI format (e.g., DCI format 2B), different resources (e.g., a different one or more resource blocks) of auxiliary UL CC 215 may be selected to transmit an A-SRS.

When a UE 115 has received the A-SRS trigger (e.g., by receiving a bit indicating such trigger in an A-SRS trigger field of a DL grant), UE 115 may provide power control for the A-SRS transmitted on the auxiliary UL CC 215.

In some examples, the transmitter power control (TPC) command field for a DCI format may be conditional, such that UE 115 uses the power control information in the TPC command field for power control of a PUCCH when the A-SRS trigger field does not indicate for UE 115 to transmit A-SRS, and UE 115 uses the power control information in the TPC command field for power control of a A-SRS when the A-SRS trigger field indicates for UE 115 to transmit an A-SRS.

In other examples, power control information may be provided to UE 115 for power control of an A-SRS in a field of the DCI format dedicated to an A-SRS TPC command. Thus, when an A-SRS trigger is indicated in a DL grant according to the above modified DCI formats, then a A-SRS TPC command field may be present. In some examples, the A-SRS TPC command field may be always present, although not used for a A-SRS TPC command unless the A-SRS trigger is indicated.

In further examples, UE 115 may continuously monitor for DCI in a DCI format associated with UL power control (e.g., legacy LTE DCI formats 3 and 3A) when UE 115 is configured according to an auxiliary UL configuration (e.g., to aperiodically transmit an A-SRS in auxiliary UL CC 215). UL power control information for an A-SRS may then be determined from DCI received in DCI format 3 and 3A.

In a second example, the transmission of A-SRS in auxiliary UL CC 215 may be triggered based on an UL grant received on DL CC 205. In some examples the UL grant may be a legacy UL grant (e.g., having DCI format 0) that is interpreted to trigger an A-SRS when certain fields or parameters are set to predetermined values. The UL grant may be configured by base station 105 such that an A-SRS may be triggered when UE 115 interprets a certain field or fields of the UL grant as including a predetermined combination of values. Base station 105 may include certain values or contents in the UL grant that would otherwise be used for transmitting PUSCH (e.g., MCS, number of resource blocks, etc.) to trigger an A-SRS. In other words, an A-SRS may be transmitted instead of transmitting PUSCH data. For example, one bit in the DCI format associated with the UL grant may indicate whether the UL grant refers to a DL CC that shares its frequency resources with an UL CC (e.g., the DL CC 205 and the CA UL CC 210 are paired CCs), or whether the UL grant refers to a DL CC that does not share its frequency resources with an UL CC (e.g., the DL CC 205 and the CA UL CC 210 are unpaired CCs). If UE 115 determines that the DCI format associated with the UL grant indicates it is associated with the latter (e.g., unpaired CCs), then UE 115 may evaluate certain contents of the UL grant to determine whether the contents has to be set to certain predetermined values to trigger the transmission of an A-SRS by UE 115 to base station 105. For example, UE 115 may be preconfigured to trigger the transmission of an A-SRS if MCS in an UL grant is set to 29 and the number of resource blocks is also set to a certain value. Such resources may be available, for example, because UE 115 may be configured to monitor for UL grants for A-SRS transmission.

In other examples, an UL grant that refers to a DL CC that shares its frequency resources with an UL CC (e.g., the DL CC 205 and the CA UL CC 210 are paired CCs), may be used to trigger an A-SRS. In some examples, bits in an UL grant may be used to trigger A-SRSs associated with a number of different auxiliary UL CCs 215 in a particular auxiliary UL configuration. For example, UE 115 may have an auxiliary UL configuration (e.g., an A-SRS configuration) that uses two or more DL CCs that do not have UL CCs associated with the same frequency resources (e.g., there are two or more auxiliary UL CCs 215). Two or more bits in an UL grant that is transmitted in a DL CC 205 (e.g. that is paired with a CA UL CC 210) may then be used by base station 105 to trigger the transmission of an A-SRS in each of the auxiliary UL CCs 215. In an example, two bits in the DL grant may be used to trigger zero, one, or both of a first A-SRS and a second A-SRS in a first auxiliary UL CC 215 and a second auxiliary UL CC 215, respectively. In some examples, the first A-SRS is time domain multiplexed with the second A-SRS.

In a third example, the transmission of an A-SRS in auxiliary UL CC 215 may be triggered as part of a group trigger that is dedicated per UE. A DCI format may be defined for a grant that may be used to trigger one or more A-SRS transmissions for a number of auxiliary UL CCs 215. For example, UE 115 may be configured to transmit an A-SRS in one or more of 31 auxiliary UL CCs 215. The DCI format may include 5 bits to specify which of the 31 auxiliary UL CCs should be used to transmit an A-SRS associated with a corresponding DL CC 205. In other examples, multiple A-SRSs may be triggered at the same time using more than 5 bits (e.g., 31 bits in the DCI format may allow each possible combination of A-SRS to be triggered for the 31 auxiliary UL CCs 215 corresponding to 31 DL CCs 205).

In some cases, additional parameters may be added to the DCI format, for example, to specify an order or other pattern for transmission of the A-SRSs in a time domain multiplexed manner. An additional parameter may provide power control information for one or more of the auxiliary UL CCs 215. In some cases, an additional parameter in the DCI format may provide timing advance (TA) information for multiple carriers, or for a timing advance group (TAG), or an A-SRS resource to use to transmit the A-SRS. In some examples, one or more of a combination of the additional parameters may be specified by fields included in the DCI format. In some examples, the DCI format may have the same length as one or more legacy DCI formats so that blind decoding by UE 115 may be simpler.

In a fourth example, the transmission of an A-SRS in auxiliary UL CC 215 may be triggered for a group of UEs (e.g., both UE 115-a and UE 115-b) by the same grant from base station 105-a. A DCI format (e.g., a group DCI) may be defined for the grant that may be used to trigger A-SRS for the multiple UEs, where each UE may also be triggered to transmit one or more A-SRSs on one or more of auxiliary UL CCs 215. For example, 4 bits in the grant associated with the DCI format may be used to trigger two different A-SRS in each of two different UEs. For example, the first two bits of the grant may be associated with UE 115-a, and may be used to trigger two A-SRSs on two auxiliary UL CCs 215 (each auxiliary UL CC corresponding to a DL CC 205 sharing the same frequency resources), and the second two bits of the grant may be associated with UE 115-b, and may be used to trigger two A-SRSs on two auxiliary UL CCs 215. In some examples, the group DCI may be transmitted by a PCC. In other examples, the group DCI may be transmitted by the PSCell. In some cases, an overhead associated with a group DCI may be reduced as compared to individual UE grants.

In some implementations, a scheduler of base station 105-a may resolve collisions between A-SRS and other uplink transmissions that may not be transmitted together. In some situations periodic SRS and A-SRS transmissions may collide. The scheduler of base station 105-a may determine whether to transmit the SRS, A-SRS, the other uplink transmissions, or all of them based on a preconfigured hierarchy of signaling. In one example, base station 105-a may use the preconfigured hierarchy of signaling to resolve collisions. In one example a HARQ PUCCH may be assigned a highest priority, followed by a PUCCH containing CSI feedback with a next lowest priority, followed by a dynamically scheduled PUSCH with a next lowest priority, followed by an A-SRS with a next lowest priority, followed by a SPS PUSCH with a next lowest priority, followed by periodic SRS with a lowest priority. In other implementations, base station 105-a may be configured to resolve collisions according to a different prioritization hierarchy, or including more or fewer types of UL and/or DL transmissions.

Figure 3:
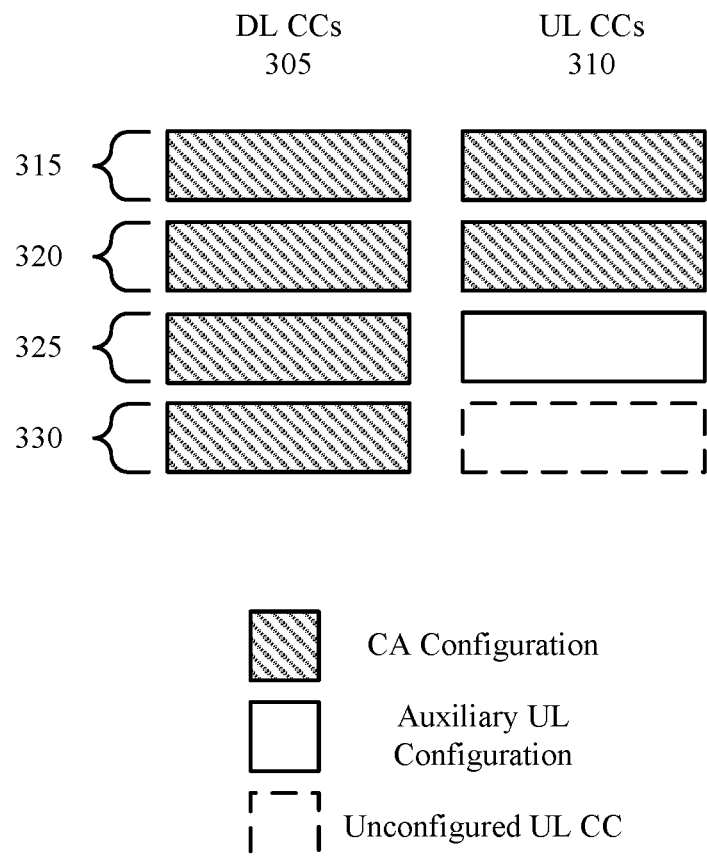
FIG. 3 illustrates an example of a CC configuration that supports A-SRS triggering for eCA in accordance with aspects of the present disclosure.

FIG. 3 illustrates an example of a CC configuration 300 that supports A-SRS triggering for eCA. In some cases, CC configuration 300 may represent aspects of techniques performed by a UE 115 or base station 105 as described with reference to FIGS. 1-2. FIG. 3 illustrates CCs in three CC configurations, including a CA configuration, an auxiliary UL configuration, and UL CCs that are unconfigured. Some of the DL CCs 305 share frequency resources with one of UL CCs 310. In particular, a DL CC and UL CC that share the same frequency resources 315 (e.g., the UL CC and DL CC may be considered to be paired, or a pair of CCs), and a DL CC and UL CC that share the same frequency resources 320 (e.g., the UL CC and DL CC may be considered to be paired or a pair of CCs), are each part of the CA configuration. The CA configuration also includes DL CCs 305, associated with frequency resources 325 and 330, that do not share frequency resources 325 and 330 with an UL CC in the CA configuration (e.g., the DL CC is not paired with a corresponding UL CC, or the CCs are unpaired CCs in the CA configuration). An UL CC 310 may be associated with frequency resources 325 and be part of an auxiliary UL configuration that may be used, e.g., to transmit an A-SRS. An UL CC 310 may be associated with frequency resources 330 and not be part of a configuration at a given time, such that only a DL CC 305 is associated with frequency resources 330.

Figure 4:
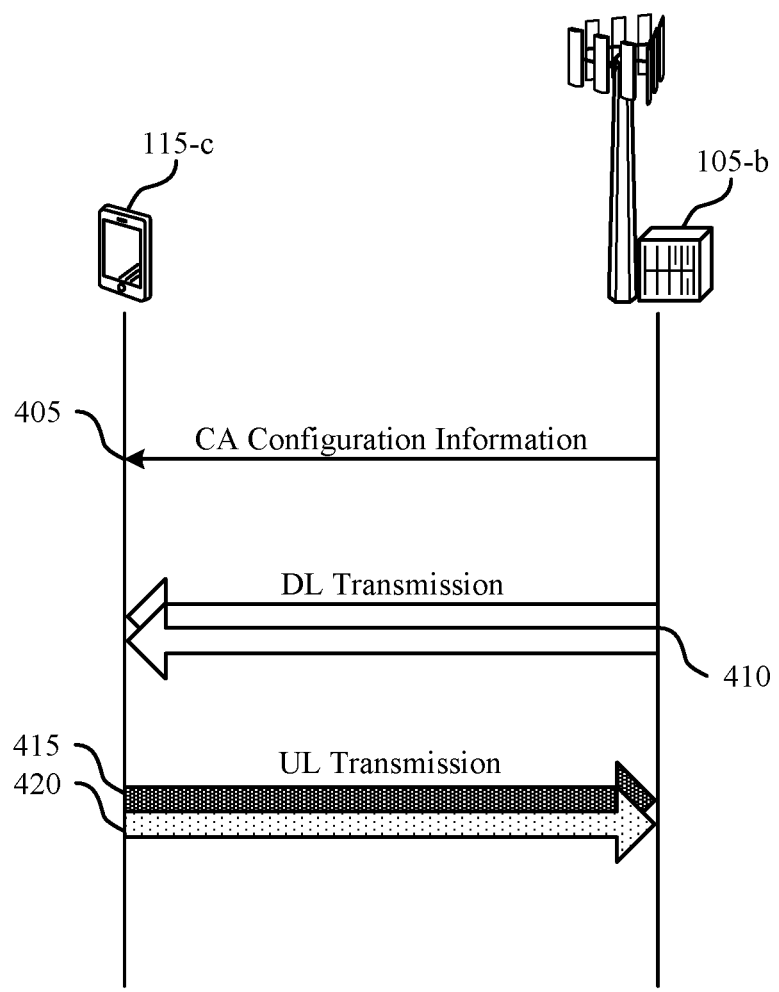
FIG. 4 illustrates an example of a process flow in a system that supports A-SRS triggering for eCA in accordance with aspects of the present disclosure.

FIG. 4 illustrates an example of a process flow 400 for A-SRS triggering for eCA. In some cases, process flow 400 may represent aspects of techniques performed by a UE 115 or base station 105 as described with reference to FIGS. 1-2.

At 405, base station 105-b may transmit, and UE 115-c may receive, CA configuration information, including a CA configuration and an auxiliary UL configuration for UE 115-c. The CA configuration may include one or more UL CCs and one or more DL CCs for UE 115-c to use to transmit and receive data with base station 105-b. The auxiliary UL configuration (e.g., an A-SRS configuration) may include one or more auxiliary UL CCs, outside the CA configuration used for data transmissions, that UE 115-*c* may use to transmit A-SRSs to base station 105-*b*, for example when triggered to do so by base station 105-*b*.

At 410, base station 105-*b* may transmit, and UE 115-*c* may receive, a DL transmission on one or more DL CCs, including a resource assignment. The resource assignment may be one or more of a DL grant, an UL grant, including a repurposed UL grant, a group grant, or other resource assignments as described above with reference to FIGS. 1-2.

At 420, UE 115-*c* may transmit an A-SRS as an UL transmission on an auxiliary UL CC based on the received resource assignment. An A-SRS may be triggered as further described above with reference to FIGS. 1-2.

UE 115-*c* may also transmit UL transmissions to base station 105-*b* using one or more CA UL CCs (e.g., which may be paired with one or more DL CCs used for DL transmissions) at 415, either at the same or different times as the A-SRS.

Figure 5:
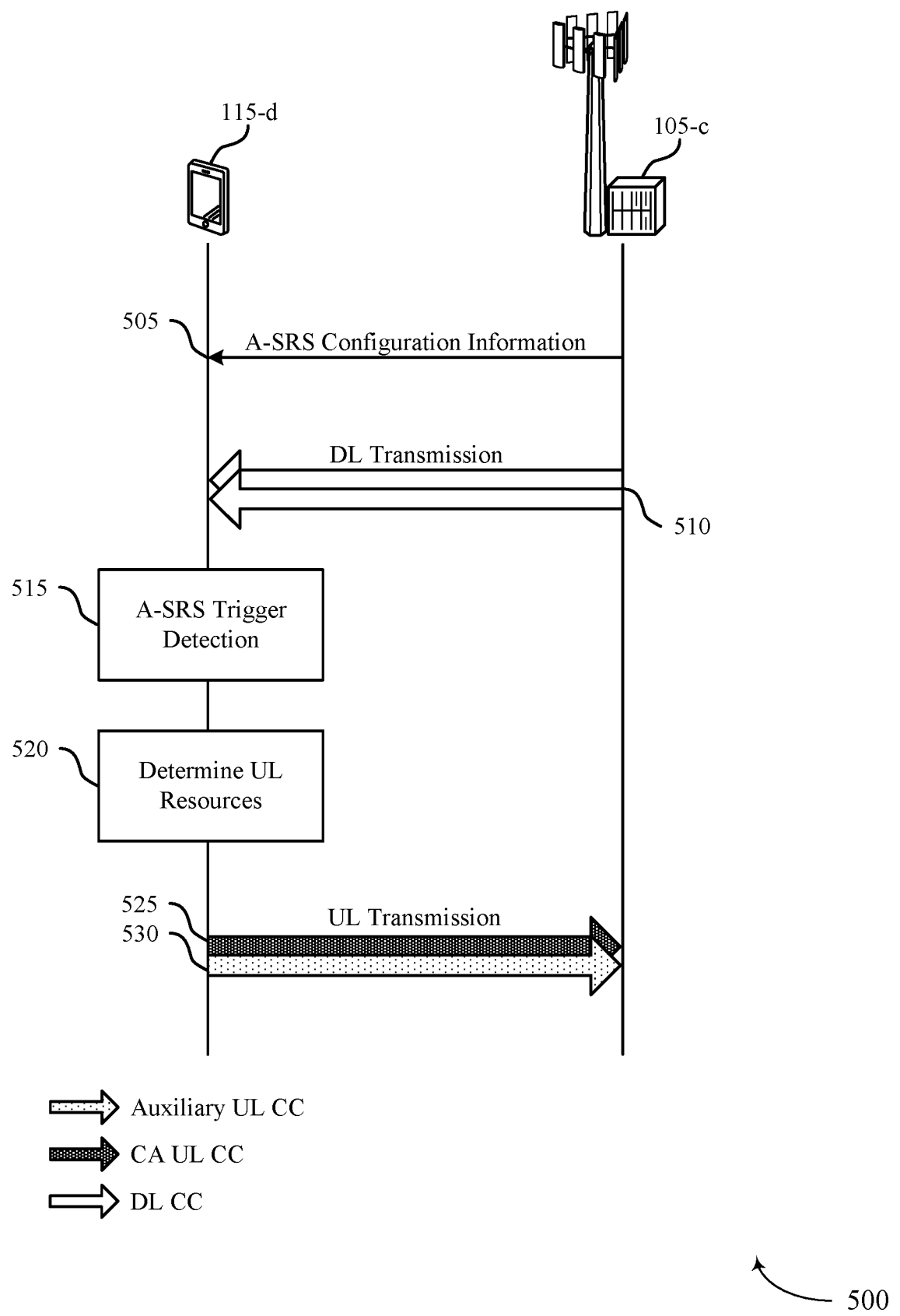
FIG. 5 illustrates an example of a process flow in a system that supports A-SRS triggering for eCA in accordance with aspects of the present disclosure.

FIG. 5 illustrates an example of a process flow 500 for A-SRS triggering for eCA. In some cases, process flow 500 may represent aspects of techniques performed by a UE 115 or base station 105 as described with reference to FIGS. 1-2.

At 505, base station 105-*c* may transmit, and UE 115-*d* may receive, A-SRS configuration information, including a CA configuration and an A-SRS configuration (e.g., an auxiliary UL configuration) for UE 115-*c*. In some examples, a radio resource control (RRC) message including the A-SRS configuration information may be sent at 505. The CA configuration may include one or more UL CCs and one or more DL CCs for UE 115-*d* to use to transmit and receive data with base station 105-*c*. The A-SRS configuration may include one or more UL CCs for A-SRS transmissions, outside the CA configuration used for data transmissions, that UE 115-*d* may use to transmit A-SRSs to base station 105-*c*, for example when triggered to do so by base station 105-*b*.

At 510, base station 105-*c* may transmit, and UE 115-*d* may receive, a DL transmission on one or more DL CCs, including a resource assignment. The resource assignment may be one or more of a DL grant, an UL grant, including a repurposed UL grant, a group grant, or other resource assignments as described above with reference to FIGS. 1-2.

At 515, UE 115-*d* may detect a trigger for transmitting an A-SRS based on the resource assignment received from base station 105-*c*. An A-SRS may be triggered as further described above with reference to FIGS. 1-2.

At 520, UE 115-*d* may determine UL resources of the A-SRS configuration to use to transmit the A-SRS, or one or more A-SRSs, to base station 105-*c*. UL resources may be determined as further described above with reference to FIGS. 1-2.

At 530, UE 115-*c* may transmit one or more A-SRSs as an UL transmission on an UL CC based on the determined resource assignment. In some examples, the UL CCs used to transmit the one or more A-SRSs may share frequency resources with one or more dedicated DL CCs used for data transmission from base station 105-*c* to UE 115-*d* according to the CA configuration.

UE 115-*d* may also transmit UL transmissions to base station 105-*c* using one or more CA UL CCs (e.g., which may be paired with one or more DL CCs used for DL transmissions) at 525, either at the same or different times as the A-SRS.

Figure 6:
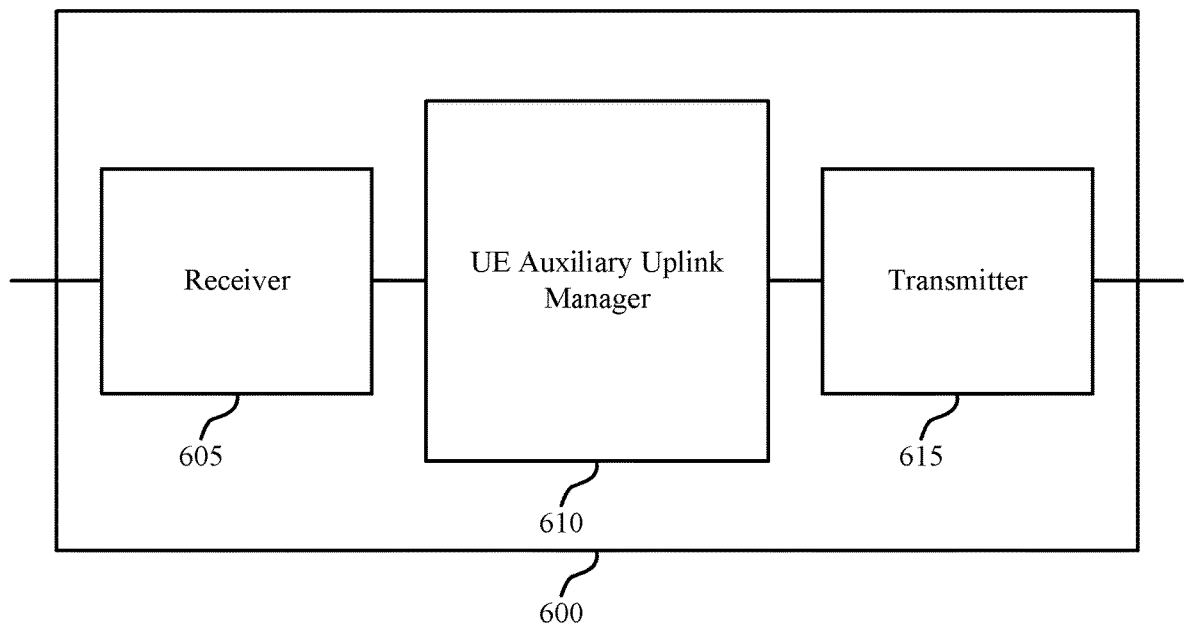
FIGS. 6 through 8 show block diagrams of a wireless device that supports A-SRS triggering for eCA in accordance with aspects of the present disclosure.

FIG. 6 shows a block diagram of a wireless device 600 that supports A-SRS triggering for eCA in accordance with various aspects of the present disclosure. Wireless device 600 may be an example of aspects of a UE 115 described with reference to FIGS. 1 and 2. Wireless device 600 may include receiver 605, UE auxiliary uplink manager 610 and transmitter 615. Wireless device 600 may also include a processor. Each of these components may be in communication with each other.

The receiver 605 may receive information such as packets, user data, or control information associated with various information channels (e.g., control channels, data channels, and information related to A-SRS triggering for eCA, etc.). Information may be passed on to other components of the device. The receiver 605 may be an example of aspects of the transceiver 925 described with reference to FIG. 9.

The UE auxiliary uplink manager 610 may identify a CA configuration and an A-SRS configuration, receive a resource assignment on a DL carrier in the CA configuration, detect a trigger for transmitting an A-SRS based on the resource assignment, determine UL resources of the A-SRS configuration for transmitting the A-SRS, transmit the A-SRS on the determined UL resources, receive signaling that indicates a CA configuration and an auxiliary UL configuration, the CA configuration comprising one or more carriers configured for UL and DL data transmissions, and the auxiliary UL configuration comprising one or more carriers configured for UL reference signal transmissions, receive a resource assignment on a DL carrier of the CA configuration, and transmit an A-SRS using the one or more carriers of the auxiliary UL configuration based on the received resource assignment. The UE auxiliary uplink manager 610 may also be an example of aspects of the UE auxiliary uplink manager 905 described with reference to FIG. 9.

The transmitter 615 may transmit signals received from other components of wireless device 600. In some examples, the transmitter 615 may be collocated with a receiver in a transceiver module. For example, the transmitter 615 may be an example of aspects of the transceiver 925 described with reference to FIG. 9. The transmitter 615 may include a single antenna, or it may include a plurality of antennas.

Figure 7:
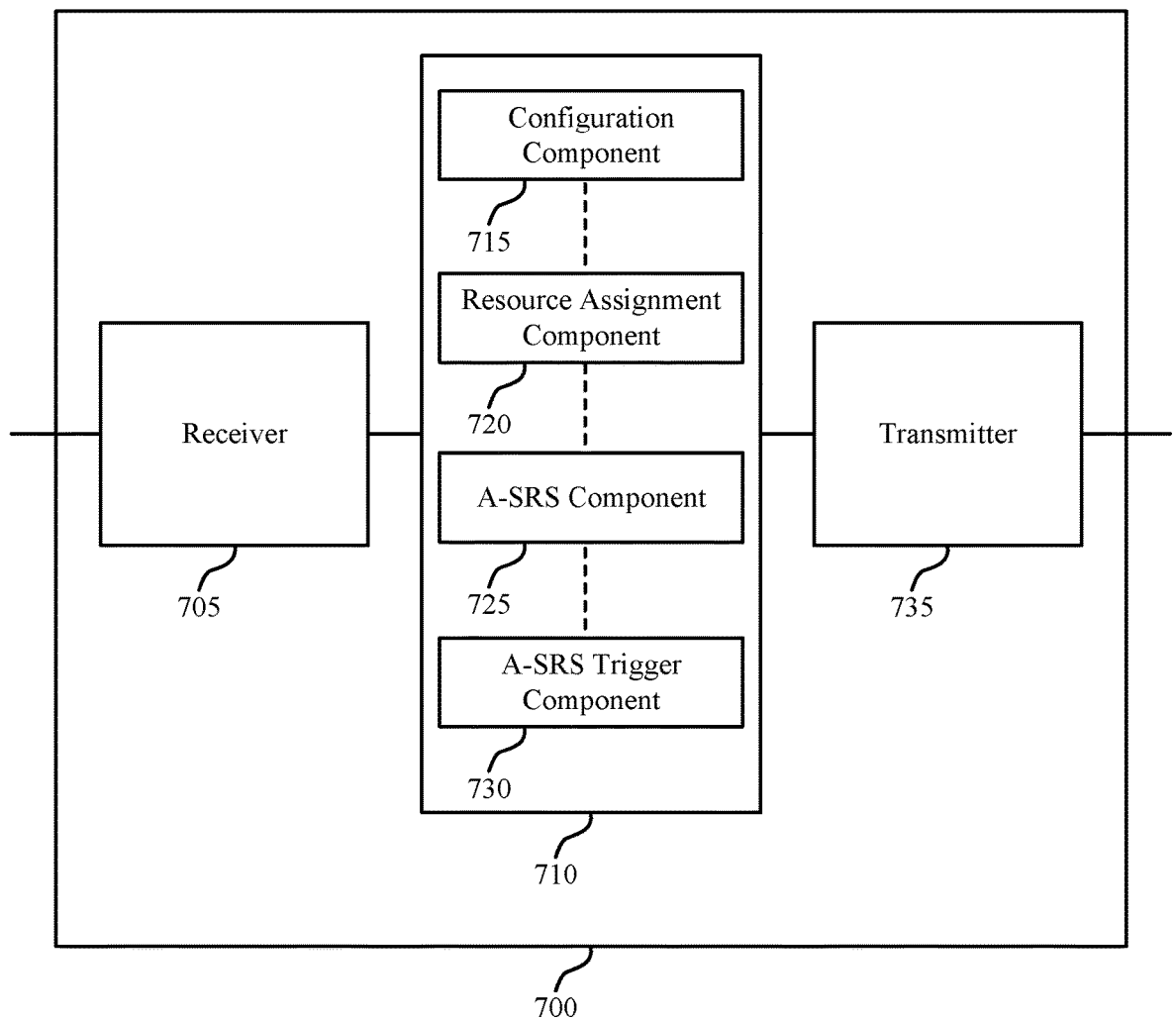

FIG. 7 shows a block diagram of a wireless device 700 that supports A-SRS triggering for eCA in accordance with various aspects of the present disclosure. Wireless device 700 may be an example of aspects of a wireless device 600 or a UE 115 described with reference to FIGS. 1, 2 and 6. Wireless device 700 may include receiver 705, UE auxiliary uplink manager 710 and transmitter 735. Wireless device 700 may also include a processor. Each of these components may be in communication with each other.

The receiver 705 may receive information which may be passed on to other components of the device. The receiver 705 may also perform the functions described with reference to the receiver 605 of FIG. 6. The receiver 705 may be an example of aspects of the transceiver 925 described with reference to FIG. 9.

The UE auxiliary uplink manager 710 may be an example of aspects of UE auxiliary uplink manager 610 described with reference to FIG. 6. The UE auxiliary uplink manager 710 may include configuration component 715, resource assignment component 720, A-SRS component 725 and A-SRS trigger component 730. The UE auxiliary uplink manager 710 may be an example of aspects of the UE auxiliary uplink manager 905 described with reference to FIG. 9.

The configuration component 715 may receive an RRC message to configure the UE with the CA configuration and the auxiliary UL configuration, where the RRC message includes A-SRS configurations for a set of UEs, receive an A-SRS configuration, where the A-SRS configuration identifies one or more UL carriers dedicated for transmitting the A-SRS, receive an RRC message to configure the UE with the CA configuration and the A-SRS configuration, where the RRC message includes A-SRS configurations for a set of UEs, and receive signaling that indicates a CA configuration and an auxiliary UL configuration, the CA configuration comprising one or more carriers configured for UL and DL data transmissions, and the auxiliary UL configuration comprising one or more carriers configured for UL reference signal transmissions. In some cases, the auxiliary UL configuration comprises an A-SRS configuration. In some cases, a DL carrier of the CA configuration and a carrier of the auxiliary UL configuration share frequency resources.

The resource assignment component 720 may identify resource for UL or DL transmissions, determine that the received resource assignment is associated with the auxiliary UL configuration and is in the resource assignment format, determine a resource assignment format associated with the received resource assignment, determine resources used to transmit the A-SRS based on the determined resource assignment format, identify the resource assignment as for an UL data transmission, determine to transmit the A-SRS based on the identification, receive, in the resource assignment, an UL grant associated with a set of A-SRSs for a set of carriers based on the received resource assignment, identify resources for the A-SRS to be transmitted using the one or more carriers of the auxiliary UL configuration, receive a resource assignment on a DL carrier in the CA configuration, determine UL resources of the A-SRS configuration for transmitting the A-SRS, and receive a resource assignment on a DL carrier of the CA configuration.

In some cases, the resource assignment comprises a DL grant. In some cases, the resource assignment comprises an UL grant for resources of the one or more carriers configured for UL data transmissions. In some cases, the resource assignment comprises a DL grant having a format selected from a set of available DL grant formats based on a transmission mode of the UE, where each DL grant formats of the set of available DL grant formats comprise an A-SRS trigger when the UE is configured with the A-SRS configuration. In some cases, the resource assignment comprises a sounding reference signal radio network temporary identifier (SRS-RNTI), where the SRS-RNTI triggers a set of A-SRSs in a set of UL resources of the A-SRS configuration.

The A-SRS component 725 may transmit the A-SRS transmissions on the determined UL CCs, and transmit an A-SRS using the one or more carriers of the auxiliary UL configuration based on the received resource assignment. The A-SRS trigger component 730 may detect a trigger for transmitting A-SRS transmissions using UL CCs based on a DCI format of the resource assignment.

The transmitter 735 may transmit signals received from other components of wireless device 700. In some examples, the transmitter 735 may be collocated with a receiver in a transceiver module. For example, the transmitter 735 may be an example of aspects of the transceiver 925 described with reference to FIG. 9. The transmitter 735 may utilize a single antenna, or it may utilize a plurality of antennas.

Figure 8:
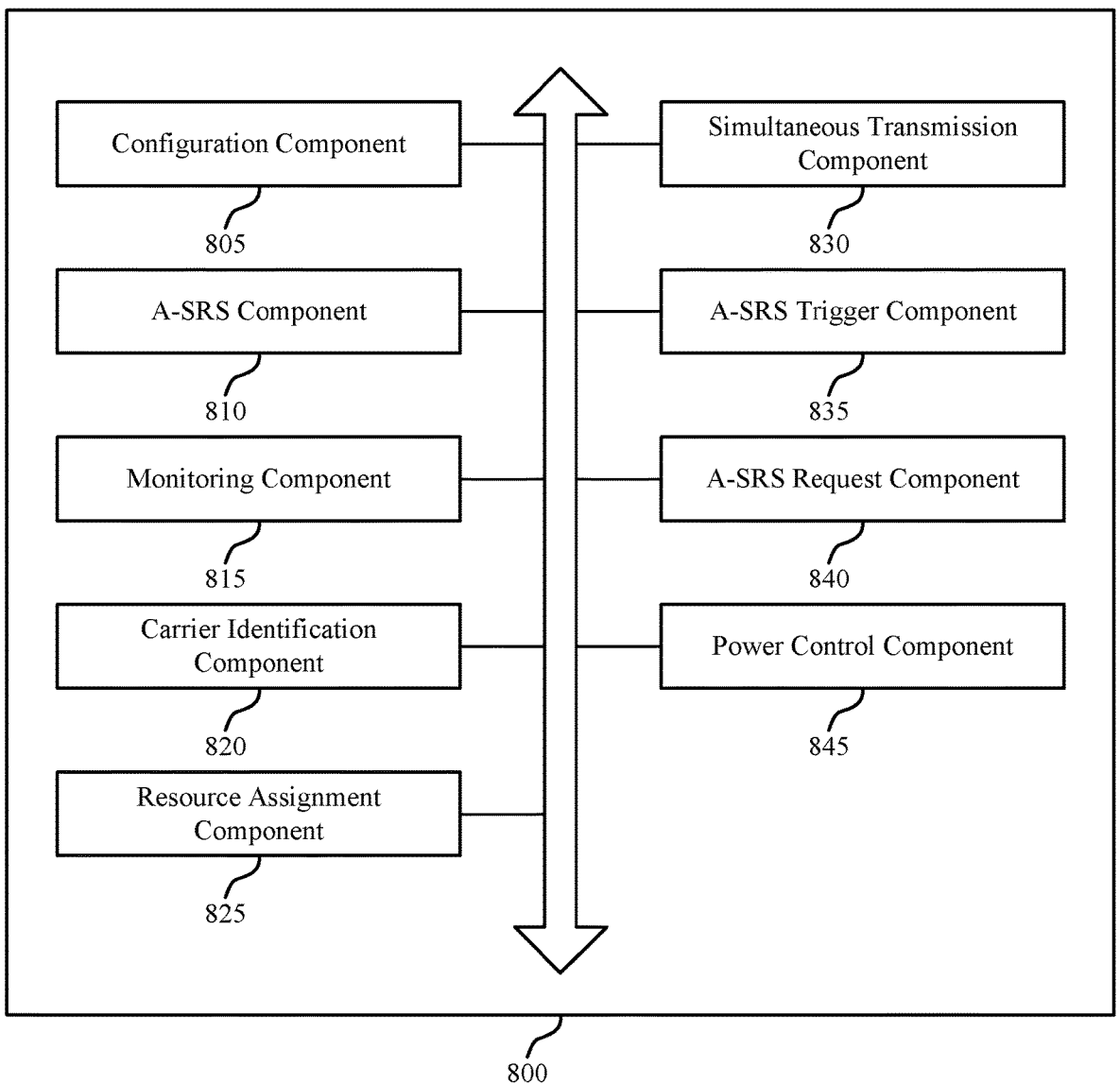

FIG. 8 shows a block diagram of a UE auxiliary uplink manager 800 which may be an example of the corresponding component of wireless device 600 or wireless device 700. That is, UE auxiliary uplink manager 800 may be an example of aspects of UE auxiliary uplink manager 610 or UE auxiliary uplink manager 710 described with reference to FIGS. 6 and 7. The UE auxiliary uplink manager 800 may also be an example of aspects of the UE auxiliary uplink manager 905 described with reference to FIG. 9.

The UE auxiliary uplink manager 800 may include configuration component 805, A-SRS component 810, monitoring component 815, carrier identification component 820, resource assignment component 825, simultaneous transmission component 830, A-SRS trigger component 835, A-SRS request component 840 and power control component 845. Each of these modules may communicate, directly or indirectly, with one another (e.g., via one or more buses).

The configuration component 805 may receive an RRC message to configure the UE with the CA configuration and the auxiliary UL configuration, where the RRC message includes A-SRS configurations for a set of UEs, receive an A-SRS configuration, where the A-SRS configuration identifies one or more UL carriers dedicated for transmitting the A-SRS, receive an RRC message to configure the UE with the CA configuration and the A-SRS configuration, where the RRC message includes A-SRS configurations for a set of UEs, and receive signaling that indicates a CA configuration and an auxiliary UL configuration, the CA configuration comprising one or more carriers configured for UL and DL data transmissions, and the auxiliary UL configuration comprising one or more carriers configured for UL reference signal transmissions.

The A-SRS component 810 may transmit the A-SRS transmissions on the determined UL CCs, and transmit an A-SRS using the one or more carriers of the auxiliary UL configuration based on the received resource assignment. The monitoring component 815 may monitor the DL carrier of the CA configuration for a resource assignment format associated with an UL power control.

The carrier identification component 820 may identify a set of carriers of the auxiliary UL configuration based on the received resource assignment, identify auxiliary based on a plurality of bits of the resource assignment configured according to a DCI format, transmit a set of A-SRSs on the identified set of carriers, and identify, for the UE, the one or more carriers of the auxiliary UL configuration to be used to transmit the A-SRS of the set of A-SRSs associated with the UE. In some cases, the resource assignment comprises a set of A-SRS trigger bits to indicate the set of carriers. In some cases, the resource assignment comprises an indication of a time domain multiplexed (TDM) ordering of the set of A-SRSs, power control information for the set of carriers, or timing advance information for the set of carriers.

The resource assignment component 825 may determine that the received resource assignment is associated with the auxiliary UL configuration and is in the resource assignment format, determine a resource assignment format associated with the received resource assignment, determine resources used to transmit the A-SRS based on the determined resource assignment format, identify the resource assignment as for an UL data transmission, determine to transmit the A-SRS based on the identification, receive, in the resource assignment, an UL grant associated with a set of A-SRSs for a set of carriers based on the received resource assignment, identify resources for the A-SRS to be transmitted using the one or more carriers of the auxiliary UL configuration, receive a resource assignment on a DL carrier in the CA configuration, determine UL CCs of the A-SRS configuration for transmitting the A-SRS transmissions based on the DCI format of the resource assignment, and receive a resource assignment on a DL carrier of the CA configuration.

The simultaneous transmission component 830 may identify that an UL channel is to be transmitted simultaneously on the one or more of the auxiliary UL configuration, identify non-A-SRS uplink transmissions to be transmitted simultaneously with A-SRS transmissions, and determine whether to transmit the A-SRS transmissions, the non-A-SRS transmissions, or both according to a priority hierarchy.

The A-SRS trigger component 835 may detect a detect a trigger for transmitting A-SRS transmissions using UL CCs based on a DCI format of the resource assignment. The A-SRS request component 840 may receive an A-SRS request field in the resource assignment, and determine to transmit the A-SRS based on the A-SRS request field.

The power control component 845 may receive, in the resource assignment, a power control command, identify power control information in a field of a DCI format that includes an A-SRS TPC command, determine a transmit power based at least on the power control command, transmit the A-SRS based on the transmit power, and identify one or more bits of the resource assignment format as associated with power control for the A-SRS. In some cases, the power control command is transmitted using signaling that is for an UL control channel absent the power control command associated with the A-SRS. In some cases, the power control command comprises an explicit indication of power control for the A-SRS in the resource assignment.

Figure 9:
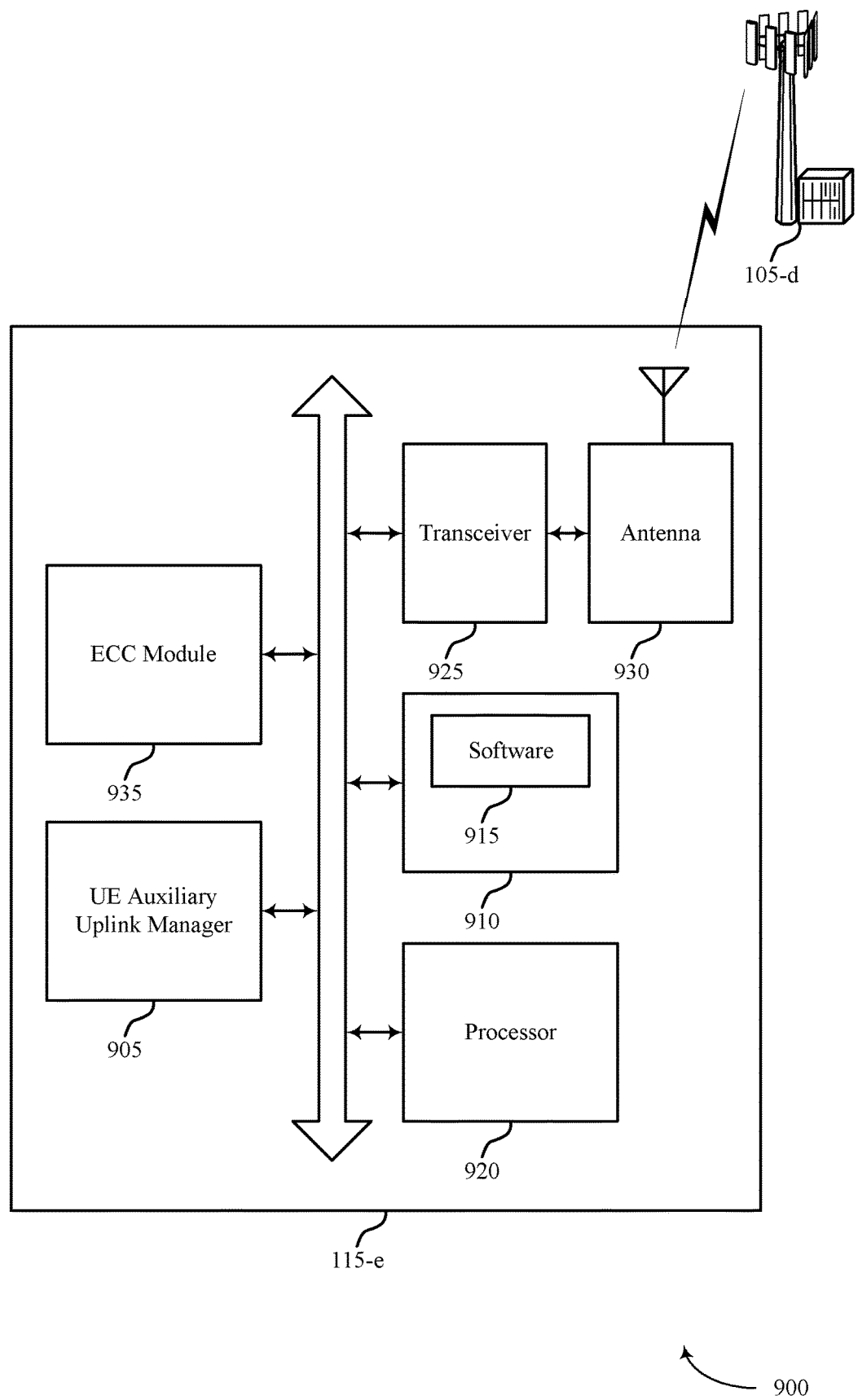
FIG. 9 illustrates a block diagram of a system including a UE that supports A-SRS triggering for eCA in accordance with aspects of the present disclosure.

FIG. 9 shows a diagram of a system 900 including a device that supports A-SRS triggering for eCA in accordance with various aspects of the present disclosure. For example, system 900 may include UE 115-*e*, which may be an example of a wireless device 600, a wireless device 700, or a UE 115 as described with reference to FIGS. 1, 2 and 6 through 8.

UE 115-*e* may also include UE auxiliary uplink manager 905, memory 910, processor 920, transceiver 925, antenna 930 and ECC module 935. Each of these modules may communicate, directly or indirectly, with one another (e.g., via one or more buses). The UE auxiliary uplink manager 905 may be an example of a UE auxiliary uplink manager as described with reference to FIGS. 6 through 8.

The memory 910 may include random access memory (RAM) and read only memory (ROM). The memory 910 may store computer-readable, computer-executable software including instructions that, when executed, cause the processor to perform various functions described herein (e.g., A-SRS triggering for eCA, etc.). In some cases, the software 915 may not be directly executable by the processor but may cause a computer (e.g., when compiled and executed) to perform functions described herein. The processor 920 may include an intelligent hardware device, (e.g., a central processing unit (CPU), a microcontroller, an application specific integrated circuit (ASIC), etc.)

The transceiver 925 may communicate bi-directionally, via one or more antennas, wired, or wireless links, with one or more networks, as described above. For example, the transceiver 925 may communicate bi-directionally with a base station 105 or a UE 115. The transceiver 925 may also include a modem to modulate the packets and provide the modulated packets to the antennas for transmission, and to demodulate packets received from the antennas. In some cases, the wireless device may include a single antenna 930. However, in some cases the device may have more than one antenna 930, which may be capable of concurrently transmitting or receiving multiple wireless transmissions.

ECC module 935 may enable operations using ECCs such as communication using shared or unlicensed spectrum, using reduced TTIs or subframe durations, or using a large number of component carriers.

Figure 10:
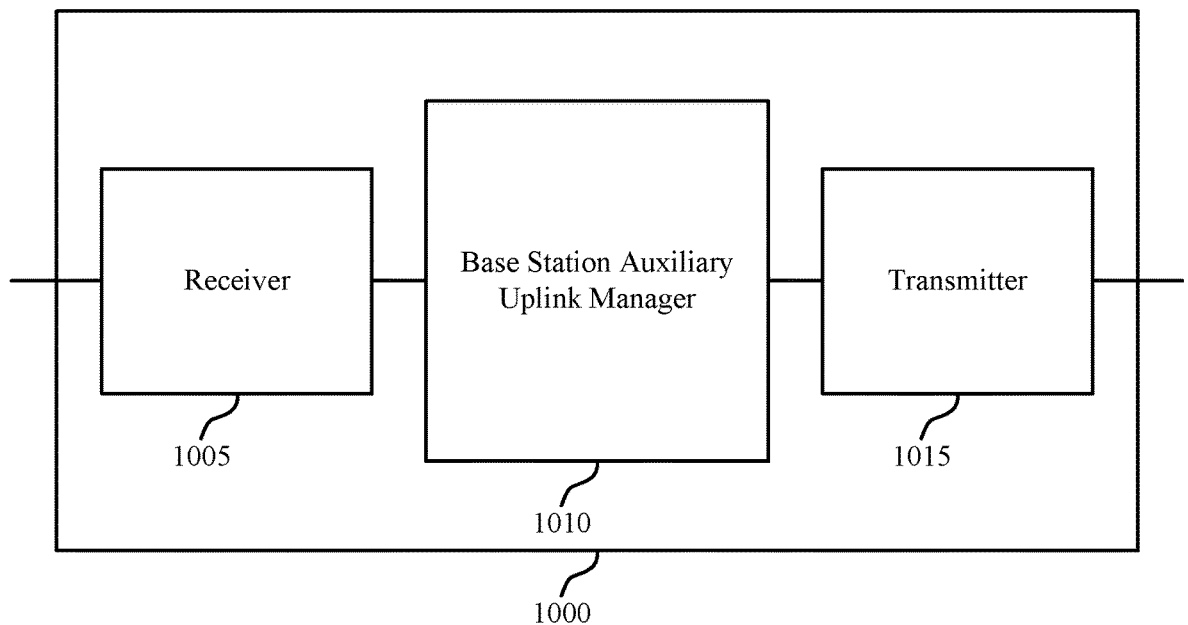
FIGS. 10 through 12 show block diagrams of a wireless device that supports A-SRS triggering for eCA in accordance with aspects of the present disclosure.

FIG. 10 shows a block diagram of a wireless device 1000 that supports A-SRS triggering for eCA in accordance with various aspects of the present disclosure. Wireless device 1000 may be an example of aspects of a base station 105 described with reference to FIGS. 1 and 2. Wireless device 1000 may include receiver 1005, base station auxiliary uplink manager 1010 and transmitter 1015. Wireless device 1000 may also include a processor. Each of these components may be in communication with each other.

The receiver 1005 may receive information such as packets, user data, or control information associated with various information channels (e.g., control channels, data channels, and information related to A-SRS triggering for eCA, etc.). Information may be passed on to other components of the device. The receiver 1005 may be an example of aspects of the transceiver 1325 described with reference to FIG. 13.

The base station auxiliary uplink manager 1010 may transmit signaling that indicates a CA configuration and an auxiliary UL configuration for a UE, the CA configuration comprising one or more carriers configured for UL and DL data transmissions, and the auxiliary UL configuration comprising one or more carriers configured for UL reference signal transmissions, transmit a resource assignment on a DL carrier of the one or more carriers of the CA configuration, and receive an A-SRS using the one or more carriers of the auxiliary UL configuration in response to the transmitted resource assignment. The base station auxiliary uplink manager 1010 may also be an example of aspects of the base station auxiliary uplink manager 1305 described with reference to FIG. 13.

The transmitter 1015 may transmit signals received from other components of wireless device 1000. In some examples, the transmitter 1015 may be collocated with a receiver in a transceiver module. For example, the transmitter 1015 may be an example of aspects of the transceiver 1325 described with reference to FIG. 13. The transmitter 1015 may include a single antenna, or it may include a plurality of antennas.

Figure 11:
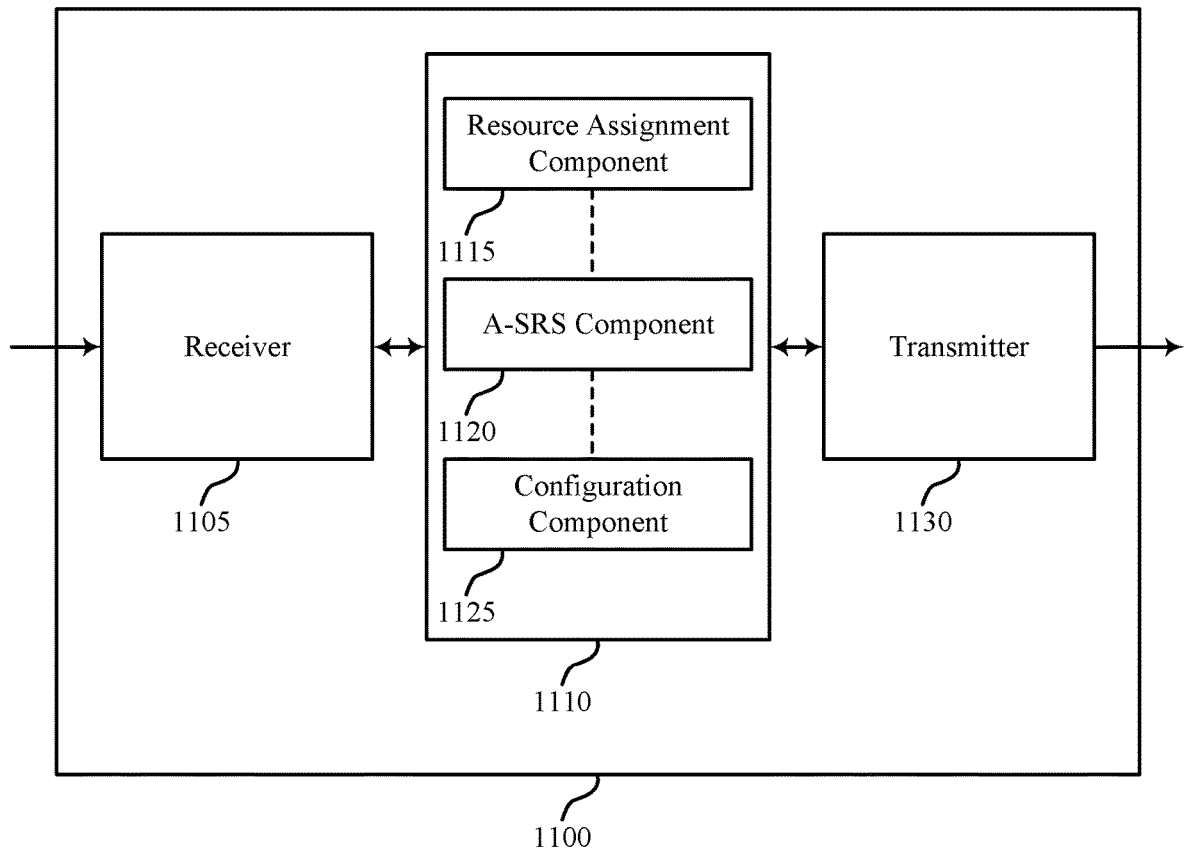

FIG. 11 shows a block diagram of a wireless device 1100 that supports A-SRS triggering for eCA in accordance with various aspects of the present disclosure. Wireless device 1100 may be an example of aspects of a wireless device 1000 or a base station 105 described with reference to FIGS. 1, 2 and 10. Wireless device 1100 may include receiver 1105, base station auxiliary uplink manager 1110 and transmitter 1130. Wireless device 1100 may also include a processor. Each of these components may be in communication with each other.

The receiver 1105 may receive information which may be passed on to other components of the device. The receiver 1105 may also perform the functions described with reference to the receiver 1005 of FIG. 10. The receiver 1105 may be an example of aspects of the transceiver 1325 described with reference to FIG. 13.

The base station auxiliary uplink manager 1110 may be an example of aspects of base station auxiliary uplink manager 1010 described with reference to FIG. 10. The base station auxiliary uplink manager 1110 may include resource assignment component 1115, A-SRS component 1120 and configuration component 1125. The base station auxiliary uplink manager 1110 may be an example of aspects of the base station auxiliary uplink manager 1305 described with reference to FIG. 13.

The resource assignment component 1115 may transmit a resource assignment on a DL carrier of the one or more carriers of the CA configuration, transmit, in the resource assignment, a power control command, where the A-SRS is based on the power control command, and transmit the resource assignment according to a resource assignment format, where the A-SRS is based on the resource assignment format.

In some cases, the resource assignment comprises a DL grant. In some cases, the transmitted resource assignment comprises a resource assignment format associated with an UL power control and including one or more bits associated with power control for the A-SRS. In some cases, the resource assignment comprises a resource assignment for an UL data transmission and the A-SRS is based on an identification of the resource assignment as for the UL data transmission.

The A-SRS component 1120 may receive A-SRS transmissions on determined UL carriers, and receive, from the set of UEs and based on the UL grant, a set of A-SRSs using the one or more carriers of the auxiliary UL configuration.

The configuration component 1125 may transmit signaling that indicates a CA configuration and an auxiliary UL configuration for a UE, the CA configuration comprising one or more carriers configured for UL and DL data transmissions, and the auxiliary UL configuration comprising one or more carriers configured for UL reference signal transmissions, and transmit an RRC message to configure a set of UEs with a set of CA and auxiliary UL configurations, including the UE with the CA configuration and the auxiliary UL configuration.

The transmitter 1130 may transmit signals received from other components of wireless device 1100. In some examples, the transmitter 1130 may be collocated with a receiver in a transceiver module. For example, the transmitter 1130 may be an example of aspects of the transceiver 1325 described with reference to FIG. 13. The transmitter 1130 may utilize a single antenna, or it may utilize a plurality of antennas.

Figure 12:
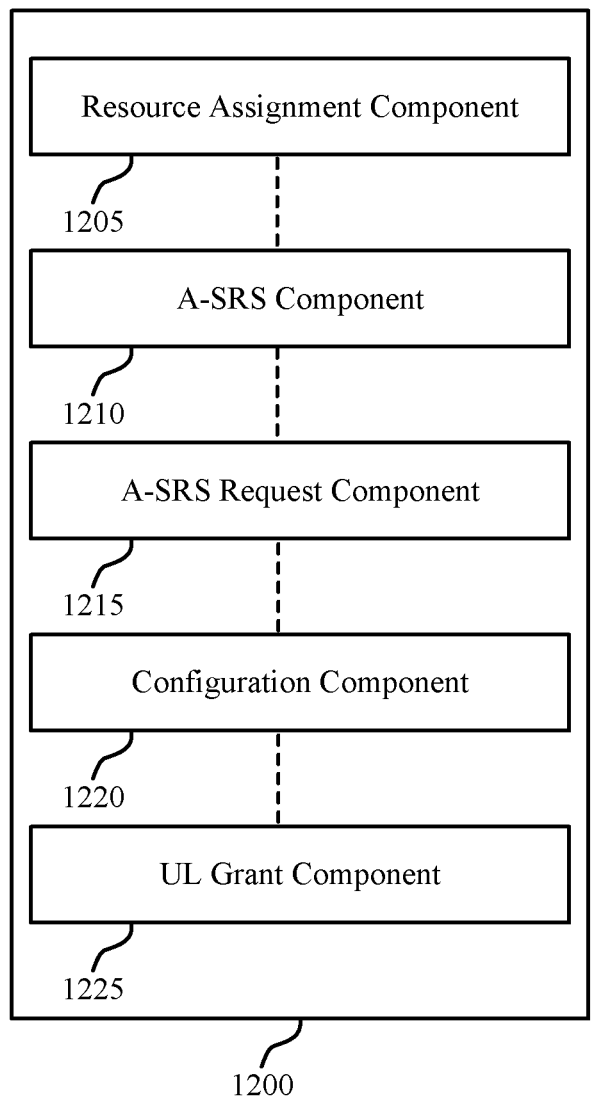

FIG. 12 shows a block diagram of a base station auxiliary uplink manager 1200 which may be an example of the corresponding component of wireless device 1000 or wireless device 1100. That is, base station auxiliary uplink manager 1200 may be an example of aspects of base station auxiliary uplink manager 1010 or base station auxiliary uplink manager 1110 described with reference to FIGS. 10 and 11. The base station auxiliary uplink manager 1200 may also be an example of aspects of the base station auxiliary uplink manager 1305 described with reference to FIG. 13.

The base station auxiliary uplink manager 1200 may include resource assignment component 1205, A-SRS component 1210, A-SRS request component 1215, configuration component 1220 and UL grant component 1225. Each of these modules may communicate, directly or indirectly, with one another (e.g., via one or more buses).

The resource assignment component 1205 may transmit a resource assignment on a DL carrier of the one or more carriers of the CA configuration, transmit power control information in a field of a DCI format that indicated an A-SRS TPC command, transmit, in the resource assignment, a power control command, where the A-SRS is based on the power control command, and transmit the resource assignment according to a resource assignment format, where the A-SRS is based on the resource assignment format.

The A-SRS component 1210 may receive an A-SRS using the one or more carriers of the auxiliary UL configuration in response to the transmitted resource assignment, and receive, from the set of UEs and based on the UL grant, a set of A-SRSs using the one or more carriers of the auxiliary UL configuration. The A-SRS request component 1215 may transmit an A-SRS request field in the resource assignment, where the A-SRS is based on the A-SRS request field.

The configuration component 1220 may transmit signaling that indicates a CA configuration and an auxiliary UL configuration for a UE, the CA configuration comprising one or more carriers configured for UL and DL data transmissions, and the auxiliary UL configuration comprising one or more carriers configured for UL reference signal transmissions, and transmit an RRC message to configure a set of UEs with a set of CA and auxiliary UL configurations, including the UE with the CA configuration and the auxiliary UL configuration.

The UL grant component 1225 may transmit, in the resource assignment, an UL grant associated with a set of UEs. In some cases, the resource assignment comprises an UL grant for resources of the one or more carriers configured for UL data transmissions.

Figure 13:
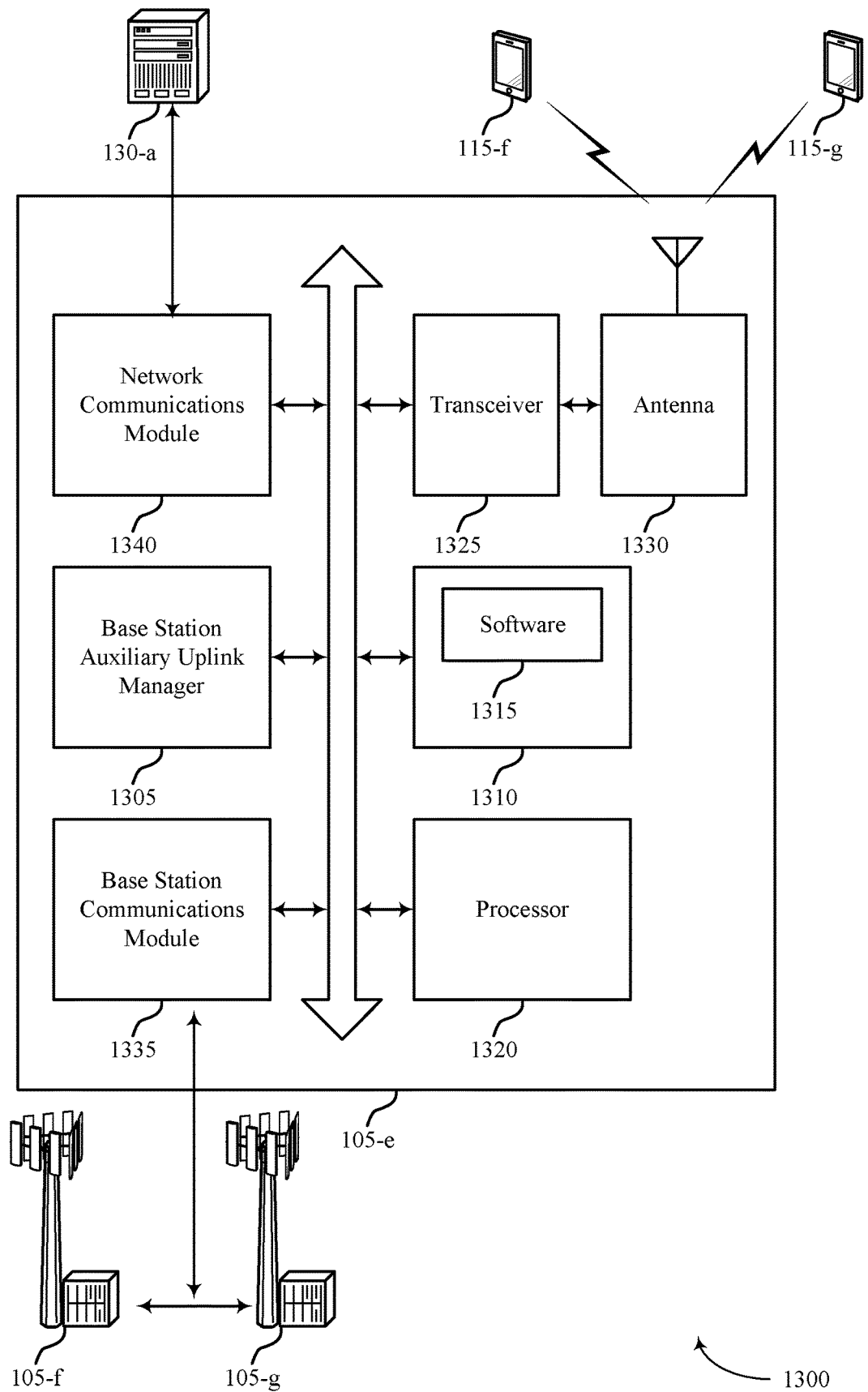
FIG. 13 illustrates a block diagram of a system including a base station that supports A-SRS triggering for eCA in accordance with aspects of the present disclosure.

FIG. 13 shows a diagram of a wireless system 1300 including a device configured that supports A-SRS triggering for eCA in accordance with various aspects of the present disclosure. For example, wireless system 1300 may include base station 105-*e*, which may be an example of a wireless device 1000, a wireless device 1100, or a base station 105 as described with reference to FIGS. 1, 2 and 10 through 12. Base station 105-*e* may also include components for bi-directional voice and data communications including components for transmitting communications and components for receiving communications. For example, base station 105-*e* may communicate bi-directionally with one or more UEs 115.

Base station 105-*e* may also include base station auxiliary uplink manager 1305, memory 1310, processor 1320, transceiver 1325, antenna 1330, base station communications module 1335 and network communications module 1340. Each of these modules may communicate, directly or indirectly, with one another (e.g., via one or more buses). The base station auxiliary uplink manager 1305 may be an example of a base station auxiliary uplink manager as described with reference to FIGS. 10 through 12.

The memory 1310 may include RAM and ROM. The memory 1310 may store computer-readable, computer-executable software including instructions that, when executed, cause the processor to perform various functions described herein (e.g., A-SRS triggering for eCA, etc.). In some cases, the software 1315 may not be directly executable by the processor but may cause a computer (e.g., when compiled and executed) to perform functions described herein. The processor 1320 may include an intelligent hardware device, (e.g., a CPU, a microcontroller, an ASIC, etc.)

The transceiver 1325 may communicate bi-directionally, via one or more antennas, wired, or wireless links, with one or more networks, as described above. For example, the transceiver 1325 may communicate bi-directionally with a base station 105 or a UE 115. The transceiver 1325 may also include a modem to modulate the packets and provide the modulated packets to the antennas for transmission, and to demodulate packets received from the antennas. In some cases, the wireless device may include a single antenna 1330. However, in some cases the device may have more than one antenna 930, which may be capable of concurrently transmitting or receiving multiple wireless transmissions.

The base station communications module 1335 may manage communications with other base station 105, and may include a controller or scheduler for controlling communications with UEs 115 in cooperation with other base stations 105. For example, the base station communications module 1335 may coordinate scheduling for transmissions to UEs 115 for various interference mitigation techniques such as beamforming or joint transmission. In some examples, base station communications module-95 may provide an X2 interface within an LTE/LTE-A wireless communication network technology to provide communication between base stations 105.

The network communications module 1340 may manage communications with the core network (e.g., via one or more wired backhaul links). For example, the network communications module 1340 may manage the transfer of data communications for client devices, such as one or more UEs 115.

Figure 14:
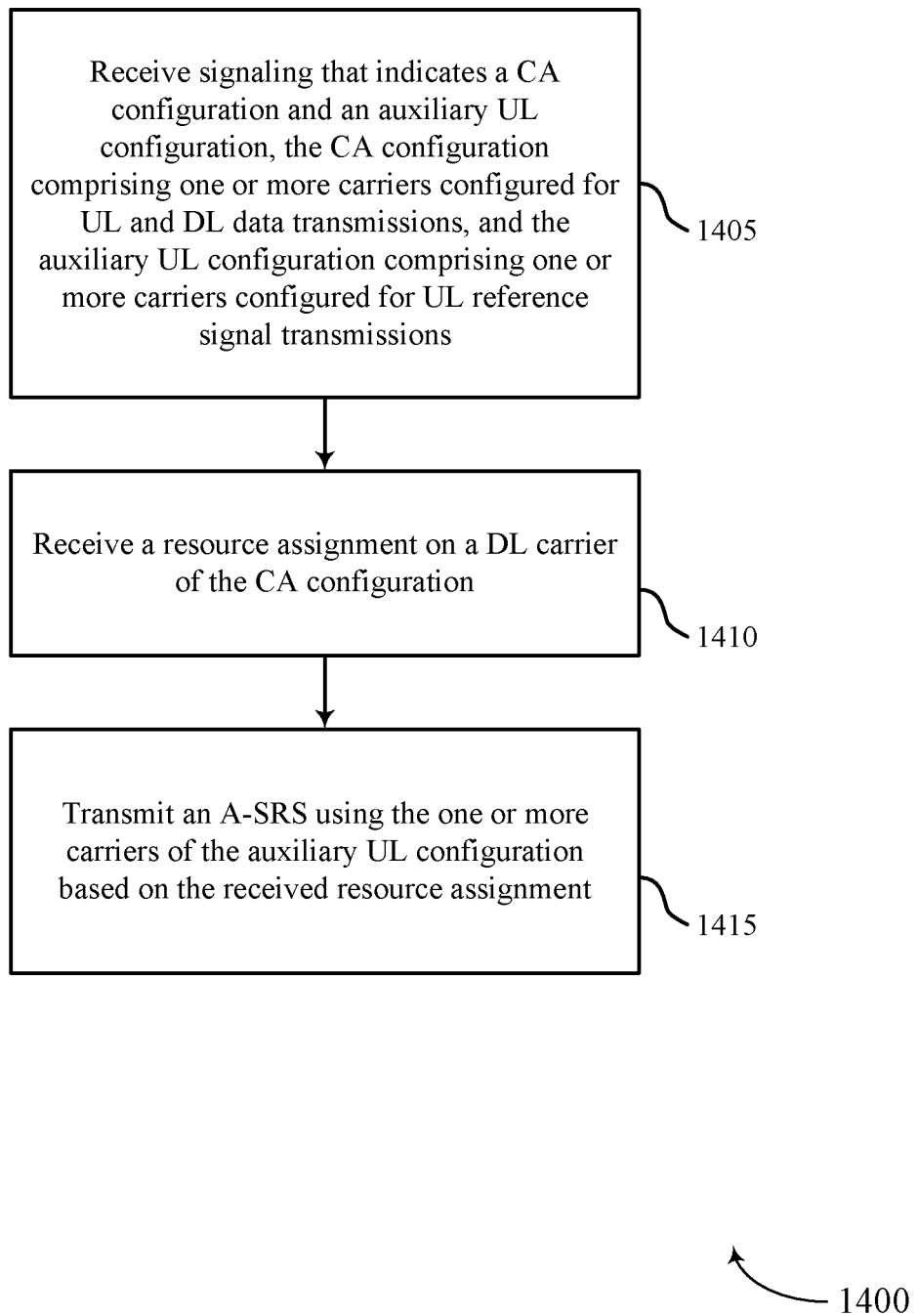
FIGS. 14 through 22 illustrate methods for A-SRS triggering for eCA in accordance with aspects of the present disclosure.

FIG. 14 shows a flowchart illustrating a method 1400 for A-SRS triggering for eCA in accordance with various aspects of the present disclosure. The operations of method 1400 may be implemented by a device such as a UE 115 or its components as described with reference to FIGS. 1 and 2. For example, the operations of method 1400 may be performed by the UE auxiliary uplink manager as described herein. In some examples, the UE 115 may execute a set of codes to control the functional elements of the device to perform the functions described below. Additionally or alternatively, the UE 115 may perform aspects the functions described below using special-purpose hardware.

At block 1405, the UE 115 may receive signaling that indicates a CA configuration and an auxiliary UL configuration, the CA configuration comprising one or more carriers configured for UL and DL data transmissions, and the auxiliary UL configuration comprising one or more carriers configured for UL reference signal transmissions as described above with reference to FIGS. 2 through 5. In certain examples, the operations of block 1405 may be performed by the configuration component as described with reference to FIGS. 7 and 8.

At block 1410, the UE 115 may receive a resource assignment on a DL carrier of the CA configuration as described above with reference to FIGS. 2 through 5. In certain examples, the operations of block 1410 may be performed by the resource assignment component as described with reference to FIGS. 7 and 8.

At block 1415, the UE 115 may transmit an A-SRS using the one or more carriers of the auxiliary UL configuration based on the received resource assignment as described above with reference to FIGS. 2 through 5. In certain examples, the operations of block 1415 may be performed by the A-SRS component as described with reference to FIGS. 7 and 8.

Figure 15:
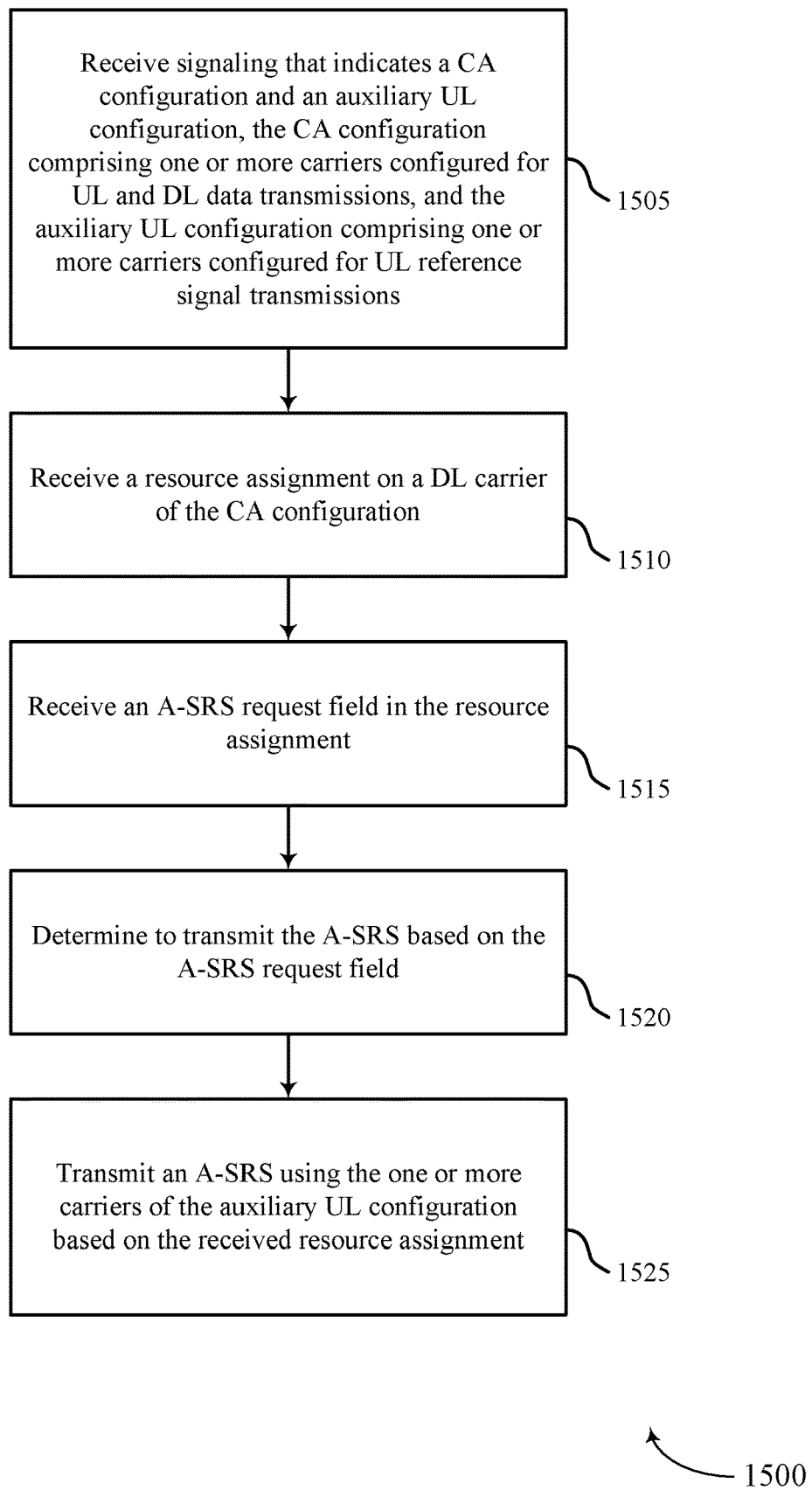

FIG. 15 shows a flowchart illustrating a method 1500 for A-SRS triggering for eCA in accordance with various aspects of the present disclosure. The operations of method 1500 may be implemented by a device such as a UE 115 or its components as described with reference to FIGS. 1 and 2. For example, the operations of method 1500 may be performed by the UE auxiliary uplink manager as described herein. In some examples, the UE 115 may execute a set of codes to control the functional elements of the device to perform the functions described below. Additionally or alternatively, the UE 115 may perform aspects the functions described below using special-purpose hardware.

At block 1505, the UE 115 may receive signaling that indicates a CA configuration and an auxiliary UL configuration, the CA configuration comprising one or more carriers configured for UL and DL data transmissions, and the auxiliary UL configuration comprising one or more carriers configured for UL reference signal transmissions as described above with reference to FIGS. 2 through 5. In certain examples, the operations of block 1505 may be performed by the configuration component as described with reference to FIGS. 7 and 8.

At block 1510, the UE 115 may receive a resource assignment on a DL carrier of the CA configuration as described above with reference to FIGS. 2 through 5. In certain examples, the operations of block 1510 may be performed by the resource assignment component as described with reference to FIGS. 7 and 8.

At block 1515, the UE 115 may receive an A-SRS request field in the resource assignment as described above with reference to FIGS. 2 through 5. In certain examples, the operations of block 1515 may be performed by the A-SRS request component as described with reference to FIGS. 7 and 8.

At block 1520, the UE 115 may determine to transmit the A-SRS based on the A-SRS request field as described above with reference to FIGS. 2 through 5. In certain examples, the operations of block 1520 may be performed by the A-SRS request component as described with reference to FIGS. 7 and 8.

At block 1525, the UE 115 may transmit an A-SRS using the one or more carriers of the auxiliary UL configuration based on the received resource assignment as described above with reference to FIGS. 2 through 5. In certain examples, the operations of block 1525 may be performed by the A-SRS component as described with reference to FIGS. 7 and 8.

Figure 16:
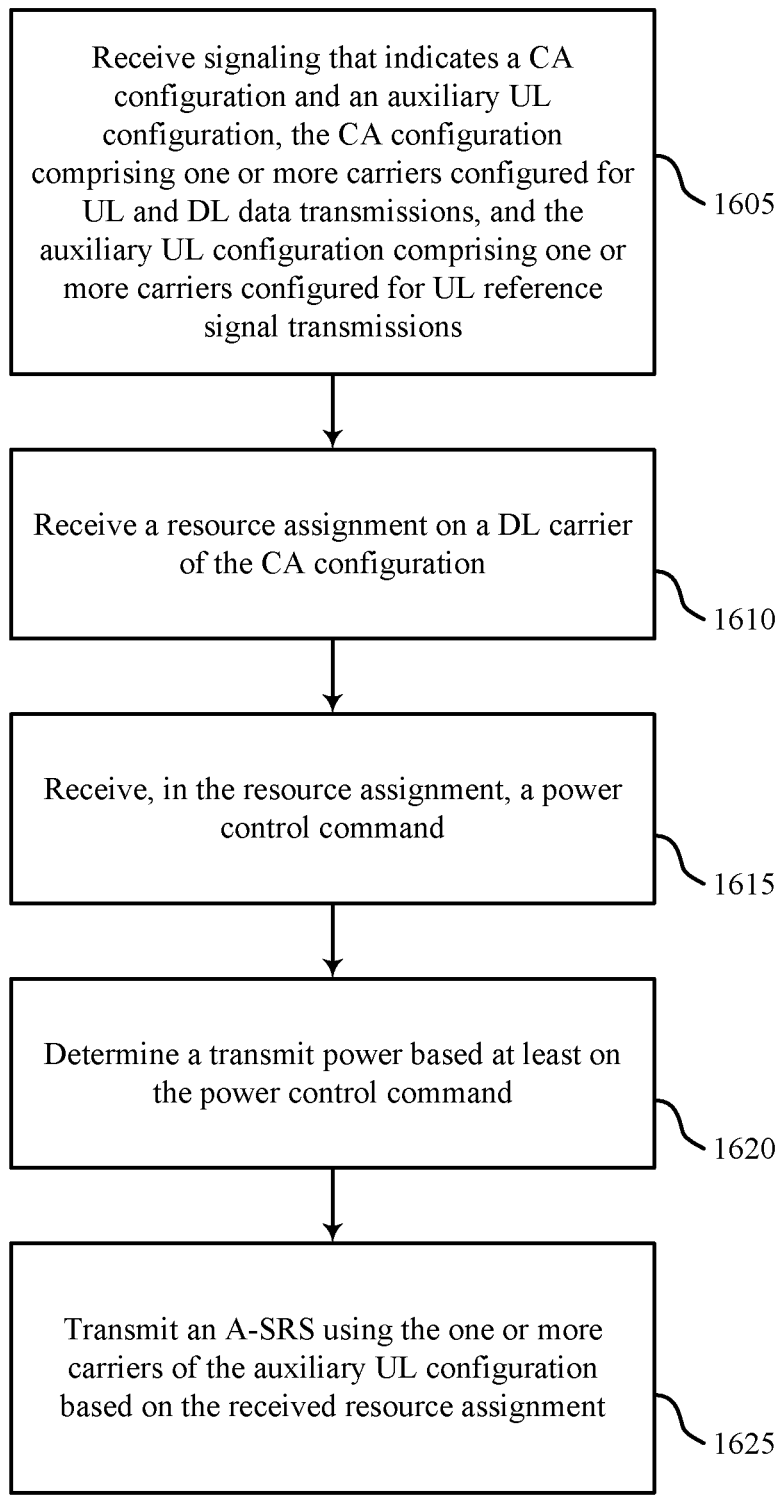

FIG. 16 shows a flowchart illustrating a method 1600 for A-SRS triggering for eCA in accordance with various aspects of the present disclosure. The operations of method 1600 may be implemented by a device such as a UE 115 or its components as described with reference to FIGS. 1 and 2. For example, the operations of method 1600 may be performed by the UE auxiliary uplink manager as described herein. In some examples, the UE 115 may execute a set of codes to control the functional elements of the device to perform the functions described below. Additionally or alternatively, the UE 115 may perform aspects the functions described below using special-purpose hardware.

At block 1605, the UE 115 may receive signaling that indicates a CA configuration and an auxiliary UL configuration, the CA configuration comprising one or more carriers configured for UL and DL data transmissions, and the auxiliary UL configuration comprising one or more carriers configured for UL reference signal transmissions as described above with reference to FIGS. 2 through 5. In certain examples, the operations of block 1605 may be performed by the configuration component as described with reference to FIGS. 7 and 8.

At block 1610, the UE 115 may receive a resource assignment on a DL carrier of the CA configuration as described above with reference to FIGS. 2 through 5. In certain examples, the operations of block 1610 may be performed by the resource assignment component as described with reference to FIGS. 7 and 8.

At block 1615, the UE 115 may receive, in the resource assignment, a power control command as described above with reference to FIGS. 2 through 5. In certain examples, the operations of block 1615 may be performed by the power control component as described with reference to FIGS. 7 and 8.

At block 1620, the UE 115 may determine a transmit power based at least on the power control command as described above with reference to FIGS. 2 through 5. In certain examples, the operations of block 1620 may be performed by the power control component as described with reference to FIGS. 7 and 8.

At block 1625, the UE 115 may transmit an A-SRS using the one or more carriers of the auxiliary UL configuration based on the received resource assignment as described above with reference to FIGS. 2 through 5. In some cases, the UE 115 may transmit the A-SRS based on the transmit power. In certain examples, the operations of block 1625 may be performed by the A-SRS component as described with reference to FIGS. 7 and 8.

Figure 17:
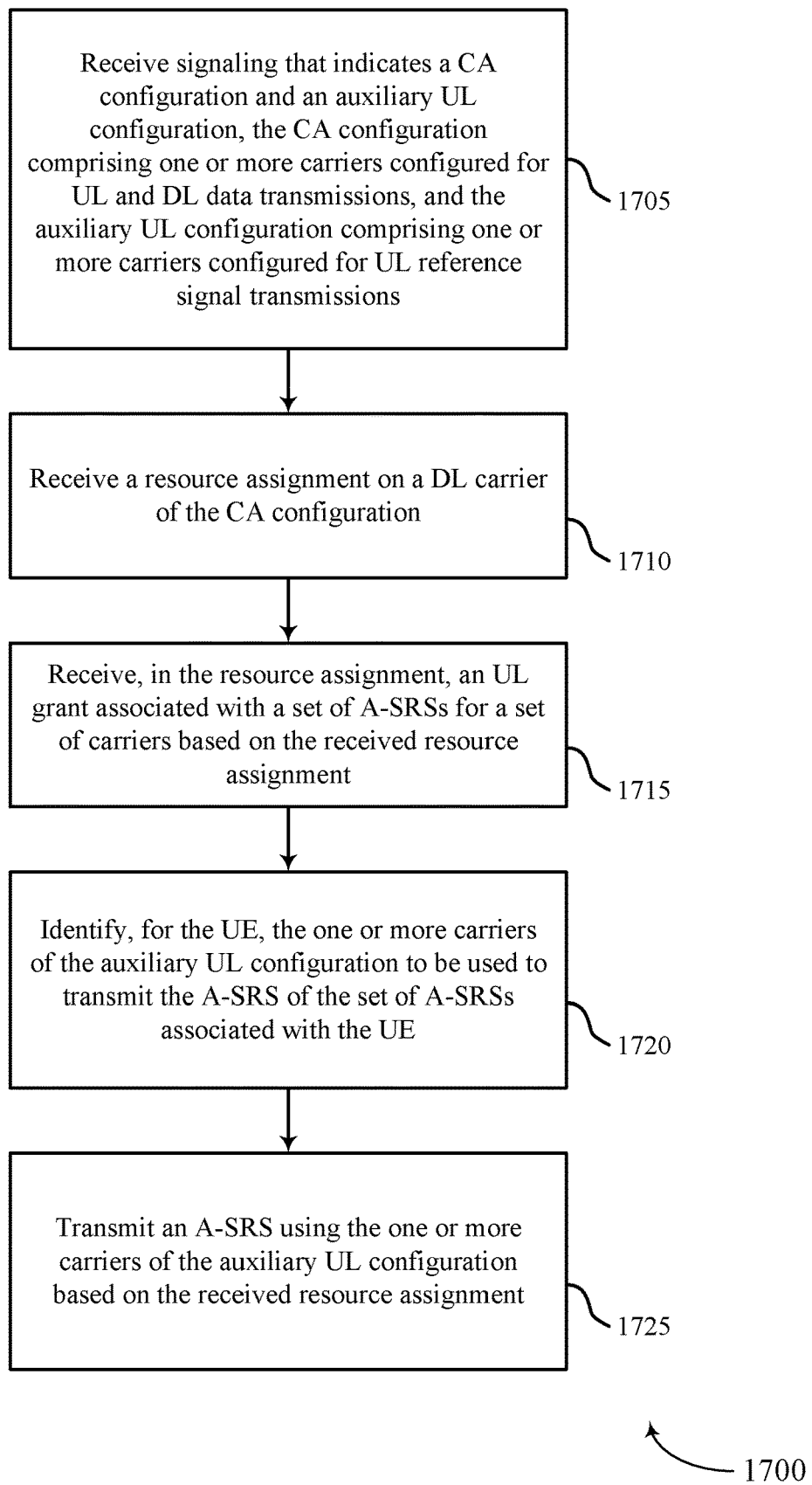

FIG. 17 shows a flowchart illustrating a method 1700 for A-SRS triggering for eCA in accordance with various aspects of the present disclosure. The operations of method 1700 may be implemented by a device such as a UE 115 or its components as described with reference to FIGS. 1 and 2. For example, the operations of method 1700 may be performed by the UE auxiliary uplink manager as described herein. In some examples, the UE 115 may execute a set of codes to control the functional elements of the device to perform the functions described below. Additionally or alternatively, the UE 115 may perform aspects the functions described below using special-purpose hardware.

At block 1705, the UE 115 may receive signaling that indicates a CA configuration and an auxiliary UL configuration, the CA configuration comprising one or more carriers configured for UL and DL data transmissions, and the auxiliary UL configuration comprising one or more carriers configured for UL reference signal transmissions as described above with reference to FIGS. 2 through 5. In certain examples, the operations of block 1705 may be performed by the configuration component as described with reference to FIGS. 7 and 8.

At block 1710, the UE 115 may receive a resource assignment on a DL carrier of the CA configuration as described above with reference to FIGS. 2 through 5. In certain examples, the operations of block 1710 may be performed by the resource assignment component as described with reference to FIGS. 7 and 8.

At block 1715, the UE 115 may receive, in the resource assignment, an UL grant associated with a set of A-SRSs for a set of carriers based on the received resource assignment as described above with reference to FIGS. 2 through 5. In certain examples, the operations of block 1715 may be performed by the resource assignment component as described with reference to FIGS. 7 and 8.

At block 1720, the UE 115 may identify, for the UE, the one or more carriers of the auxiliary UL configuration to be used to transmit the A-SRS of the set of A-SRSs associated with the UE as described above with reference to FIGS. 2 through 5. In certain examples, the operations of block 1720 may be performed by the carrier identification component as described with reference to FIGS. 7 and 8.

At block 1725, the UE 115 may transmit an A-SRS using the one or more carriers of the auxiliary UL configuration based on the received resource assignment as described above with reference to FIGS. 2 through 5. In certain examples, the operations of block 1725 may be performed by the A-SRS component as described with reference to FIGS. 7 and 8.

Figure 18:
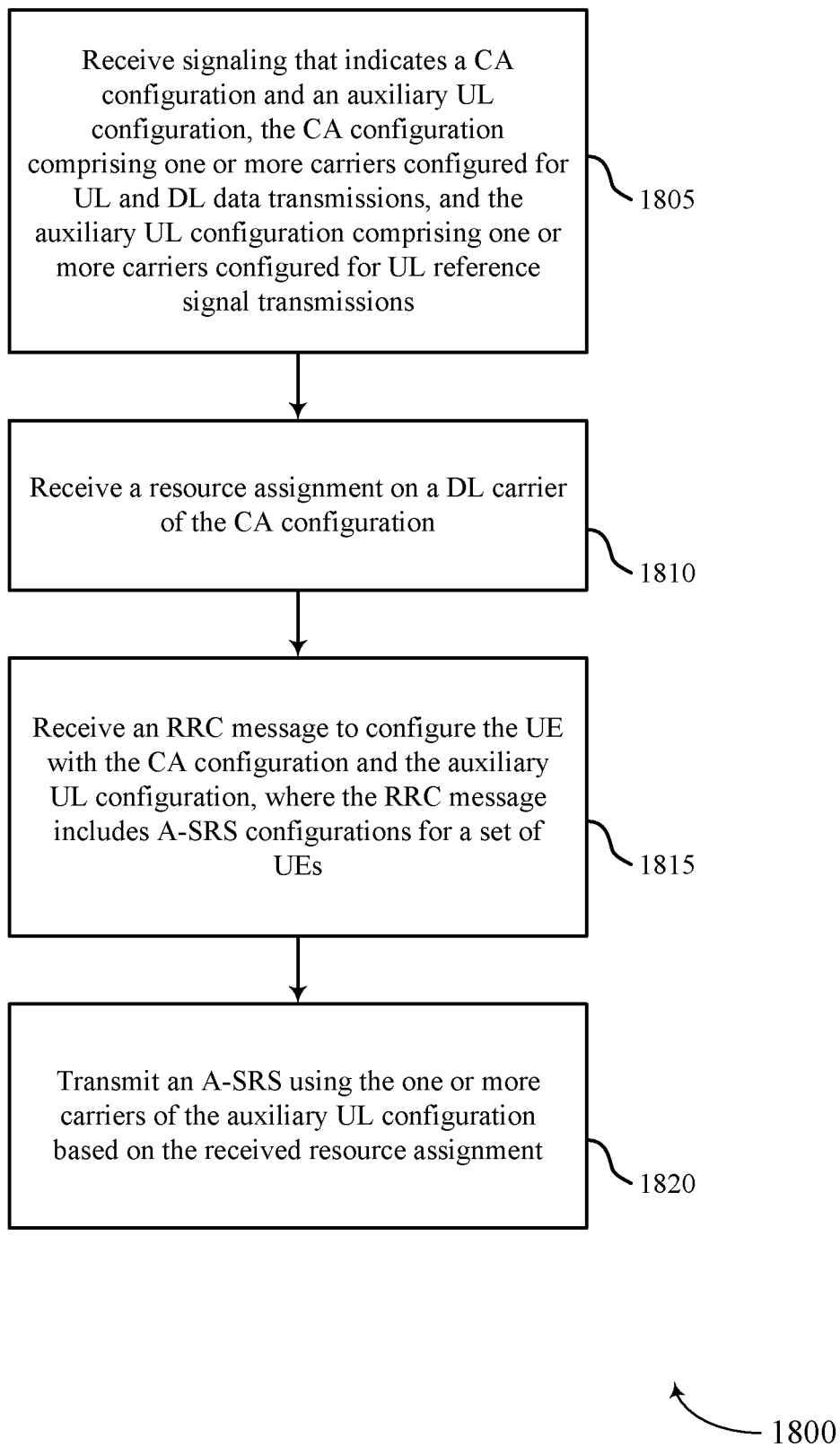

FIG. 18 shows a flowchart illustrating a method 1800 for A-SRS triggering for eCA in accordance with various aspects of the present disclosure. The operations of method 1800 may be implemented by a device such as a UE 115 or its components as described with reference to FIGS. 1 and 2. For example, the operations of method 1800 may be performed by the UE auxiliary uplink manager as described herein. In some examples, the UE 115 may execute a set of codes to control the functional elements of the device to perform the functions described below. Additionally or alternatively, the UE 115 may perform aspects the functions described below using special-purpose hardware.

At block 1805, the UE 115 may receive signaling that indicates a CA configuration and an auxiliary UL configuration, the CA configuration comprising one or more carriers configured for UL and DL data transmissions, and the auxiliary UL configuration comprising one or more carriers configured for UL reference signal transmissions as described above with reference to FIGS. 2 through 5. In certain examples, the operations of block 1805 may be performed by the configuration component as described with reference to FIGS. 7 and 8.

At block 1810, the UE 115 may receive a resource assignment on a DL carrier of the CA configuration as described above with reference to FIGS. 2 through 5. In certain examples, the operations of block 1810 may be performed by the resource assignment component as described with reference to FIGS. 7 and 8.

At block 1815, the UE 115 may receive an RRC message to configure the UE with the CA configuration and the auxiliary UL configuration, where the RRC message includes A-SRS configurations for a set of UEs as described above with reference to FIGS. 2 through 5. In certain examples, the operations of block 1815 may be performed by the configuration component as described with reference to FIGS. 7 and 8.

At block 1820, the UE 115 may transmit an A-SRS using the one or more carriers of the auxiliary UL configuration based on the received resource assignment as described above with reference to FIGS. 2 through 5. In certain examples, the operations of block 1820 may be performed by the A-SRS component as described with reference to FIGS. 7 and 8.

Figure 19:
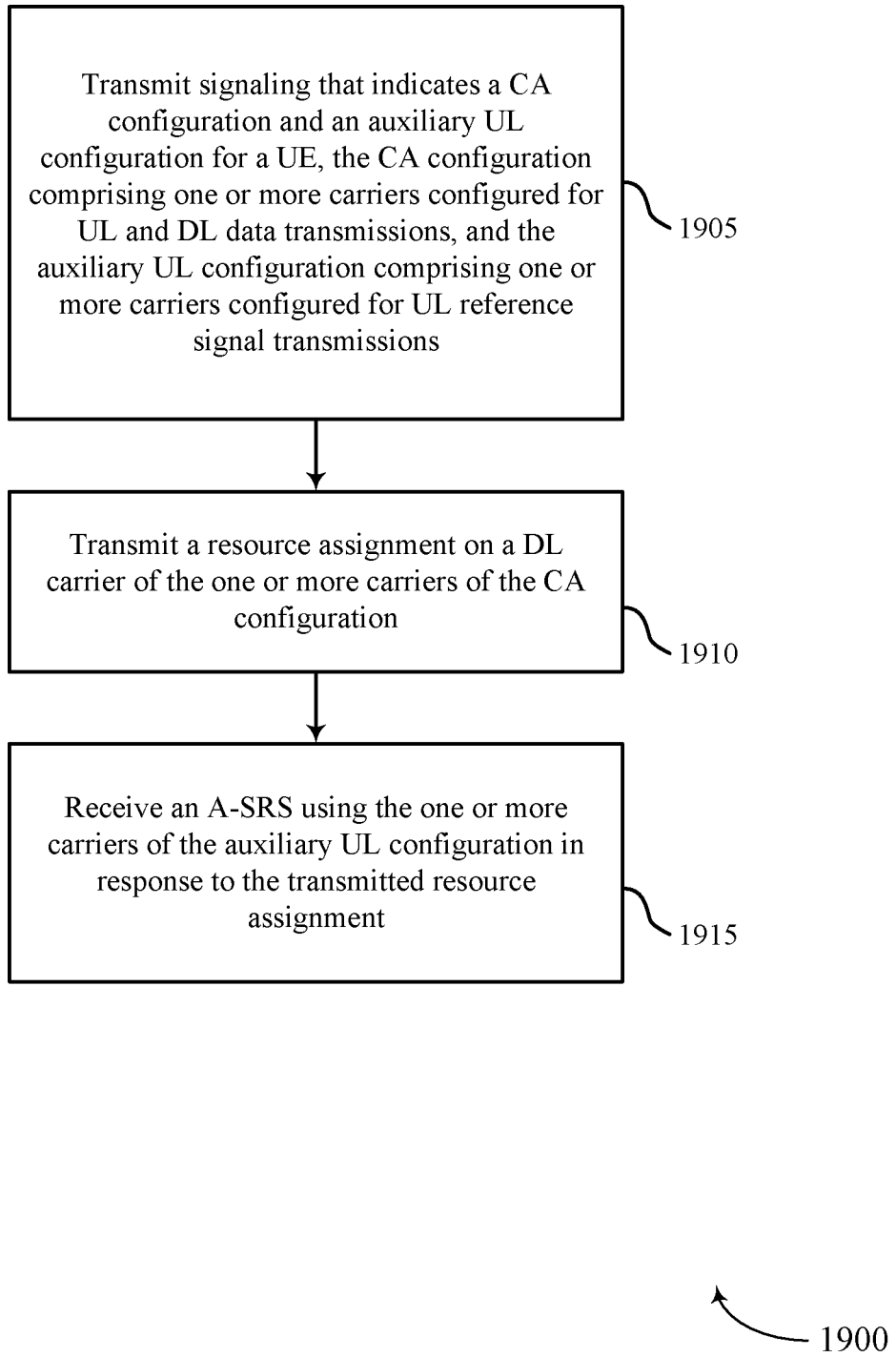

FIG. 19 shows a flowchart illustrating a method 1900 for A-SRS triggering for eCA in accordance with various aspects of the present disclosure. The operations of method 1900 may be implemented by a device such as a base station 105 or its components as described with reference to FIGS. 1 and 2. For example, the operations of method 1900 may be performed by the base station auxiliary uplink manager as described herein. In some examples, the base station 105 may execute a set of codes to control the functional elements of the device to perform the functions described below. Additionally or alternatively, the base station 105 may perform aspects the functions described below using special-purpose hardware.

At block 1905, the base station 105 may transmit signaling that indicates a CA configuration and an auxiliary UL configuration for a UE, the CA configuration comprising one or more carriers configured for UL and DL data transmissions, and the auxiliary UL configuration comprising one or more carriers configured for UL reference signal transmissions as described above with reference to FIGS. 2 through 5. In certain examples, the operations of block 1905 may be performed by the configuration component as described with reference to FIGS. 11 and 12.

At block 1910, the base station 105 may transmit a resource assignment on a DL carrier of the one or more carriers of the CA configuration as described above with reference to FIGS. 2 through 5. In certain examples, the operations of block 1910 may be performed by the resource assignment component as described with reference to FIGS. 11 and 12.

At block 1915, the base station 105 may receive an A-SRS using the one or more carriers of the auxiliary UL configuration in response to the transmitted resource assignment as described above with reference to FIGS. 2 through 5. In certain examples, the operations of block 1915 may be performed by the A-SRS component as described with reference to FIGS. 11 and 12.

Figure 20:
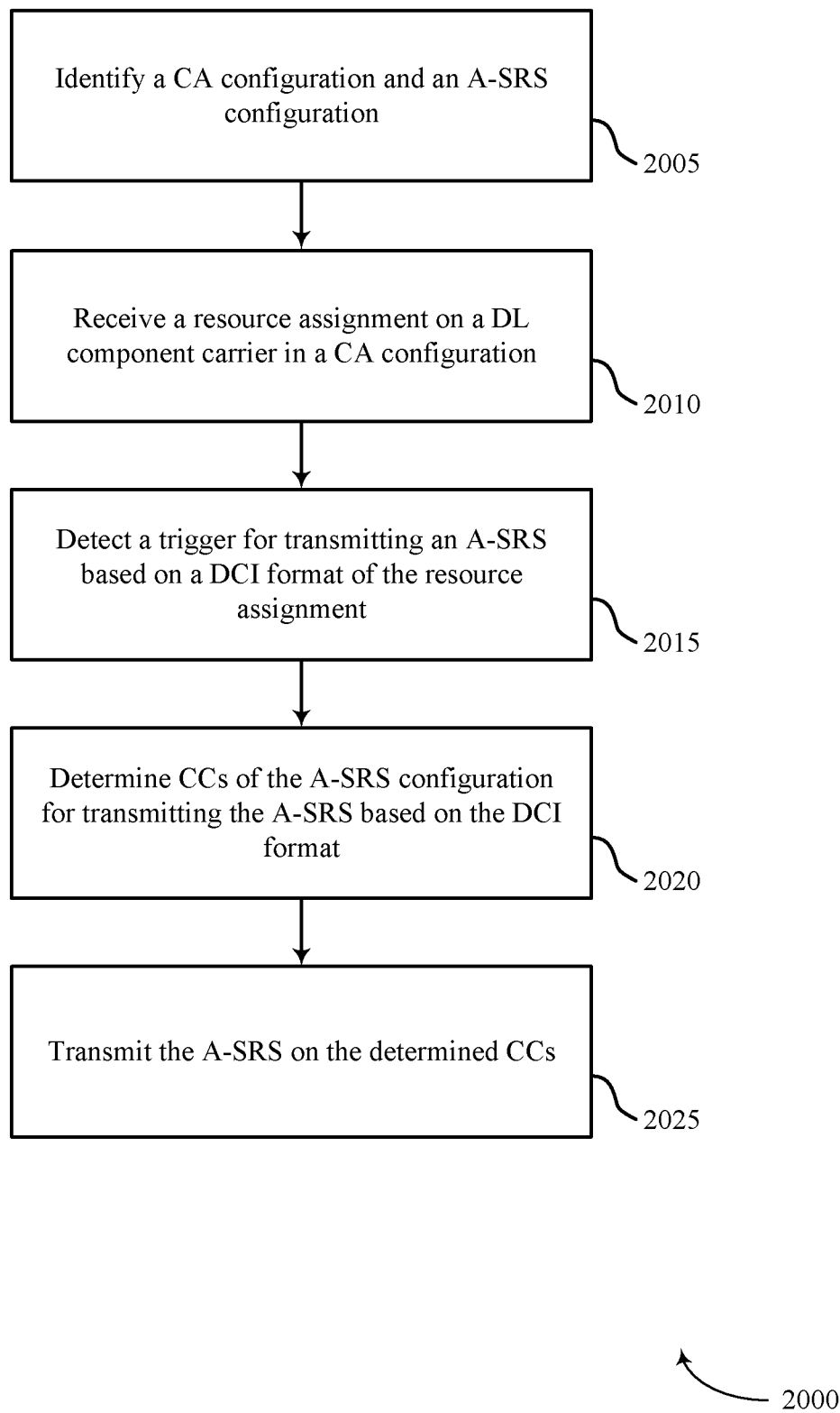

FIG. 20 shows a flowchart illustrating a method 2000 for A-SRS triggering for eCA in accordance with various aspects of the present disclosure. The operations of method 2000 may be implemented by a device such as a UE 115 or its components as described with reference to FIGS. 1 and 2. For example, the operations of method 2000 may be performed by the UE auxiliary uplink manager as described herein. In some examples, the UE 115 may execute a set of codes to control the functional elements of the device to perform the functions described below. Additionally or alternatively, the UE 115 may perform aspects the functions described below using special-purpose hardware.

At block 2005, the UE 115 may identify a CA configuration and an A-SRS configuration of the UE 115 as described above with reference to FIGS. 2 through 5. The A-SRS configuration may comprise of one or more component carriers (CCs) on which the UE does not perform UL data transmissions. In certain examples, the operations of block 2005 may be performed by the At block 2010, the UE 115 may receive a resource assignment on a DL CC in the CA configuration as described above with reference to FIGS. 2 through 5. In certain examples, the operations of block 2010 may be performed by the resource assignment component as described with reference to FIGS. 7 and 8.

At block 2015, the UE 115 may detect a trigger for transmitting an A-SRS based on a DCI format of the resource assignment as described above with reference to FIGS. 2 through 5. In certain examples, the operations of block 2015 may be performed by the A-SRS trigger component as described with reference to FIGS. 7 and 8.

At block 2020, the UE 115 may determine CCs of the A-SRS configuration for transmitting A-SRS transmissions based on the DCI format of the resource assignment as described above with reference to FIGS. 2 through 5. In certain examples, the operations of block 2020 may be performed by the resource assignment component as described with reference to FIGS. 7 and 8.

At block 2025, the UE 115 may transmit the A-SRS on the determined CCs as described above with reference to FIGS. 2 through 5. In certain examples, the operations of block 2025 may be performed by the A-SRS component as described with reference to FIGS. 7 and 8.

Figure 21:
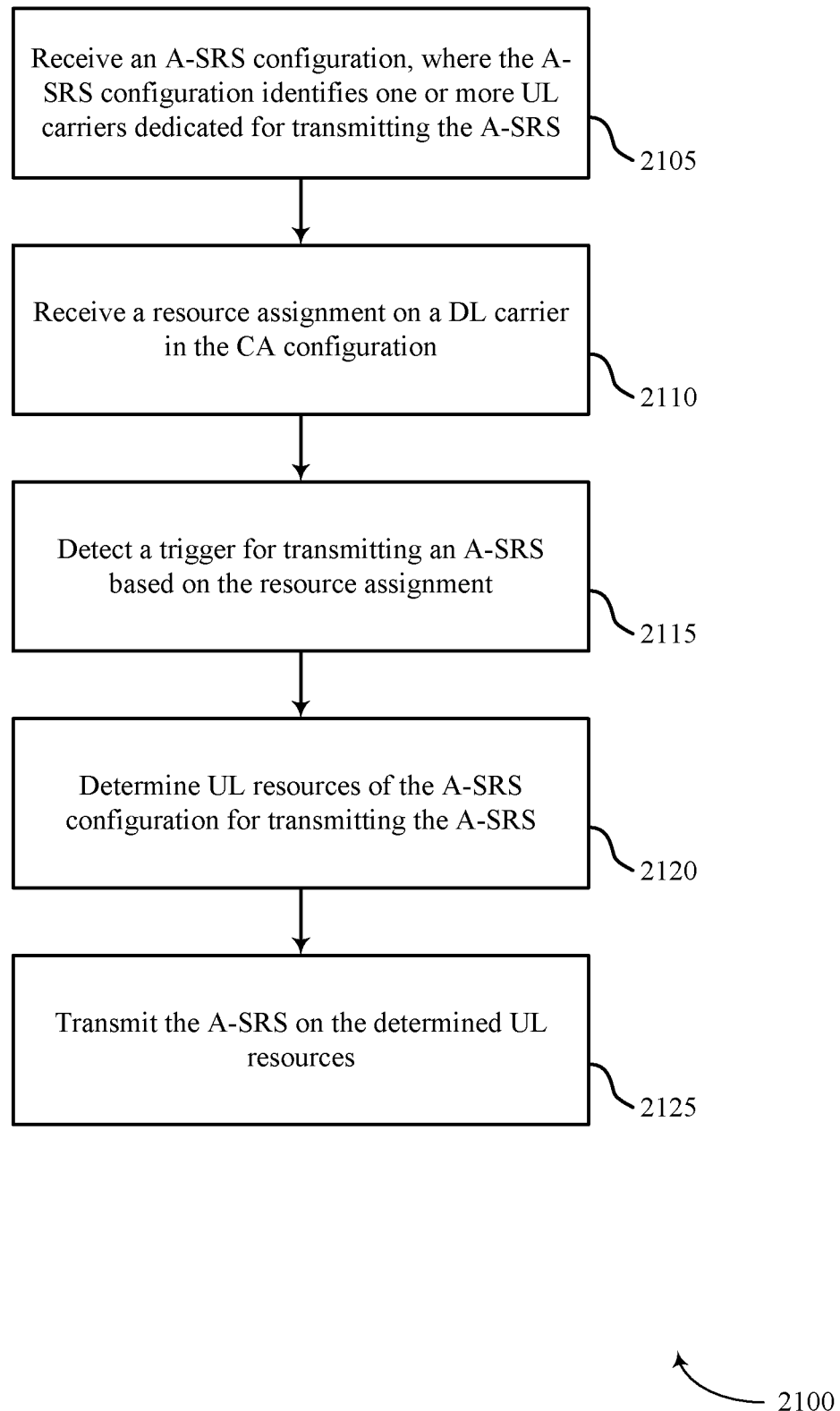

FIG. 21 shows a flowchart illustrating a method 2100 for A-SRS triggering for eCA in accordance with various aspects of the present disclosure. The operations of method 2100 may be implemented by a device such as a UE 115 or its components as described with reference to FIGS. 1 and 2. For example, the operations of method 2100 may be performed by the UE auxiliary uplink manager as described herein. In some examples, the UE 115 may execute a set of codes to control the functional elements of the device to perform the functions described below. Additionally or alternatively, the UE 115 may perform aspects the functions described below using special-purpose hardware.

At block 2105, the UE 115 may receive an A-SRS configuration, where the A-SRS configuration identifies one or more UL carriers dedicated for transmitting the A-SRS as described above with reference to FIGS. 2 through 5. In certain examples, the operations of block 2105 may be performed by the configuration component as described with reference to FIGS. 7 and 8.

At block 2110, the UE 115 may receive a resource assignment on a DL carrier in the CA configuration as described above with reference to FIGS. 2 through 5. In certain examples, the operations of block 2110 may be performed by the resource assignment component as described with reference to FIGS. 7 and 8.

At block 2115, the UE 115 may detect a trigger for transmitting an A-SRS based on the resource assignment as described above with reference to FIGS. 2 through 5. In certain examples, the operations of block 2115 may be performed by the A-SRS trigger component as described with reference to FIGS. 7 and 8.

At block 2120, the UE 115 may determine UL resources of the A-SRS configuration for transmitting the A-SRS as described above with reference to FIGS. 2 through 5. In certain examples, the operations of block 2120 may be performed by the resource assignment component as described with reference to FIGS. 7 and 8.

At block 2125, the UE 115 may transmit the A-SRS on the determined UL resources as described above with reference to FIGS. 2 through 5. In certain examples, the operations of block 2125 may be performed by the A-SRS component as described with reference to FIGS. 7 and 8.

Figure 22:
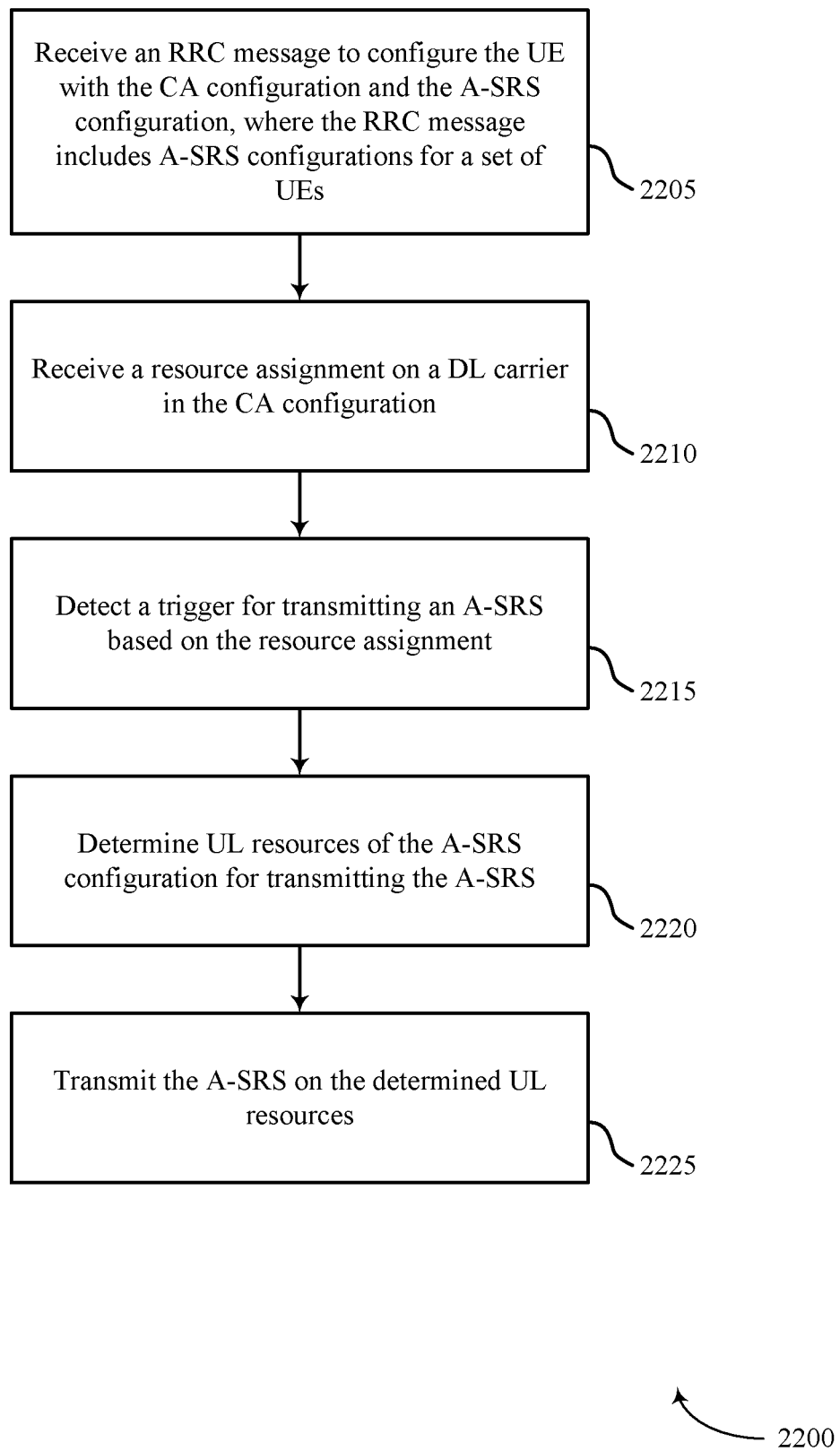

FIG. 22 shows a flowchart illustrating a method 2200 for A-SRS triggering for eCA in accordance with various aspects of the present disclosure. The operations of method 2200 may be implemented by a device such as a UE 115 or its components as described with reference to FIGS. 1 and 2. For example, the operations of method 2200 may be performed by the UE auxiliary uplink manager as described herein. In some examples, the UE 115 may execute a set of codes to control the functional elements of the device to perform the functions described below. Additionally or alternatively, the UE 115 may perform aspects the functions described below using special-purpose hardware.

At block 2205, the UE 115 may receive an RRC message to configure the UE with the CA configuration and the A-SRS configuration, where the RRC message includes A-SRS configurations for a set of UEs as described above with reference to FIGS. 2 through 5. In certain examples, the operations of block 2205 may be performed by the configuration component as described with reference to FIGS. 7 and 8.

At block 2210, the UE 115 may receive a resource assignment on a DL carrier in the CA configuration as described above with reference to FIGS. 2 through 5. In certain examples, the operations of block 2210 may be performed by the resource assignment component as described with reference to FIGS. 7 and 8.

At block 2215, the UE 115 may detect a trigger for transmitting an A-SRS based on the resource assignment as described above with reference to FIGS. 2 through 5. In certain examples, the operations of block 2215 may be performed by the A-SRS trigger component as described with reference to FIGS. 7 and 8.

At block 2220, the UE 115 may determine UL resources of the A-SRS configuration for transmitting the A-SRS as described above with reference to FIGS. 2 through 5. In certain examples, the operations of block 2220 may be performed by the resource assignment component as described with reference to FIGS. 7 and 8.

At block 2225, the UE 115 may transmit the A-SRS on the determined UL resources as described above with reference to FIGS. 2 through 5. In certain examples, the operations of block 2225 may be performed by the A-SRS component as described with reference to FIGS. 7 and 8.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for A-SRS triggering for eCA.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different (physical) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for A-SRS triggering for eCA. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication, comprising:
   receiving a resource assignment on a downlink (DL) component carrier (CC) in a carrier aggregation (CA) configuration, the resource assignment comprising an identifier associated with aperiodic sounding reference signal (A-SRS) transmissions on one or more uplink (UL) CCs outside the CA configuration used for UL data transmissions, an A-SRS trigger, and the resource assignment further comprising power control information for the A-SRS transmissions; and
   transmitting the A-SRS transmissions on the one or more UL CCs in accordance with the power control information and the A-SRS trigger.

2. The method of claim 1, wherein the identifier is a radio network temporary identifier (RNTI).

3. The method of claim 2, wherein the RNTI is a sounding reference signal RNTI.

4. The method of claim 1, wherein the one or more UL CCs are configured to transmit A-SRS and not perform UL data transmissions.

5. The method of claim 4, wherein not performing UL data transmissions comprises refraining from transmitting a physical uplink shared channel (PUSCH) on the one or more UL CCs.

6. The method of claim 1, wherein receiving the resource assignment comprises:
   receiving a downlink control information (DCI) comprising the resource assignment.

7. The method of claim 1, further comprising:
   determining, based at least in part on a second identifier associated with A-SRS transmissions, that a second one or more A-SRS transmissions are not to be transmitted; and
   transmitting a physical uplink control channel (PUCCH) transmission in accordance with the power control information based at least in part on determining that the second one or more A-SRS transmissions are not to be transmitted.

8. The method of claim 7, further comprising:
   refraining, based at least in part on the second identifier, from transmitting the second one or more A-SRS transmissions.

9. The method of claim 1, further comprising:
determining that the identifier matches a predetermined combination of values, wherein the A-SRS trigger is detected based at least in part on the matched identifier.

10. The method of claim 1, further comprising:
identifying a group trigger from the resource assignment, the group trigger comprising data to specify the one or more UL CCs in the CA configuration that are to be used in transmitting the A-SRS transmissions, wherein the transmission of the A-SRS transmissions is in accordance with the identified group trigger.

11. The method of claim 1, further comprising:
identifying, based at least in part on the resource assignment, a pattern for the transmission of the A-SRS transmissions, wherein the A-SRS transmissions are transmitted in accordance with the pattern.

12. An apparatus for wireless communication, comprising:
a processor;
memory coupled with the processor; and
instructions stored in the memory and executable by the processor to cause the apparatus to:
receive a resource assignment on a downlink (DL) component carrier (CC) in a carrier aggregation (CA) configuration, the resource assignment comprising an identifier associated with aperiodic sounding reference signal (A-SRS) transmissions on one or more uplink (UL) CCs outside the CA configuration used for UL data transmissions, an A-SRS trigger, and the resource assignment further comprising power control information for the A-SRS transmissions; and
transmit the A-SRS transmissions on the one or more UL CCs in accordance with the power control information and the A-SRS trigger.

13. The apparatus of claim 12, wherein the identifier is a radio network temporary identifier (RNTI).

14. The apparatus of claim 13, wherein the RNTI is a sounding reference signal RNTI.

15. The apparatus of claim 12, wherein the one or more UL CCs are configured to transmit A-SRS and not perform UL data transmissions.

16. The apparatus of claim 15, wherein not performing UL data transmissions comprises refraining from transmitting a physical uplink shared channel (PUSCH) on the one or more UL CCs.

17. The apparatus of claim 12, wherein the instructions to receive the resource assignment are executable by the processor to cause the apparatus to:
receive a downlink control information (DCI) comprising the resource assignment.

18. The apparatus of claim 12, wherein the instructions are further executable by the processor to cause the apparatus to:
determine, based at least in part on a second identifier associated with A-SRS transmissions, that a second one or more A-SRS transmissions are not to be transmitted; and
transmit a physical uplink control channel (PUCCH) transmission in accordance with the power control information based at least in part on determining that the second one or more A-SRS transmissions are not to be transmitted.

19. The apparatus of claim 18, wherein the instructions are further executable by the processor to cause the apparatus to:
refrain, based at least in part on the second identifier, from transmitting the second one or more A-SRS transmissions.

20. The apparatus of claim 12, wherein the instructions are further executable by the processor to cause the apparatus to:
determine that the identifier matches a predetermined combination of values, wherein the A-SRS trigger is detected based at least in part on the matched identifier.

21. The apparatus of claim 12, wherein the instructions are further executable by the processor to cause the apparatus to:
identify a group trigger from the resource assignment, the group trigger comprising data to specify the one or more UL CCs in the CA configuration that are to be used in transmitting the A-SRS transmissions, wherein the transmission of the A-SRS transmissions is in accordance with the identified group trigger.

22. The apparatus of claim 12, wherein the instructions are further executable by the processor to cause the apparatus to:
identify, based at least in part on the resource assignment, a pattern for the transmission of the A-SRS transmissions, wherein the A-SRS transmissions are transmitted in accordance with the pattern.

23. An apparatus for wireless communication, comprising:
means for receiving a resource assignment on a downlink (DL) component carrier (CC) in a carrier aggregation (CA) configuration, the resource assignment comprising an identifier associated with aperiodic sounding reference signal (A-SRS) transmissions on one or more uplink (UL) CCs outside the CA configuration used for UL data transmissions, an A-SRS trigger, and the resource assignment further comprising power control information for the A-SRS transmissions; and
means for transmitting the A-SRS transmissions on the one or more UL CCs in accordance with the power control information and the A-SRS trigger.

24. The apparatus of claim 23, wherein the identifier is a radio network temporary identifier (RNTI).

25. The apparatus of claim 24, wherein the RNTI is a sounding reference signal RNTI.

26. The apparatus of claim 23, wherein the one or more UL CCs are configured to transmit A-SRS and not perform UL data transmissions.

27. The apparatus of claim 26, wherein not performing UL data transmissions comprises refraining from transmitting a physical uplink shared channel (PUSCH) on the one or more UL CCs.

28. The apparatus of claim 23, further comprising:
means for determining, based at least in part on a second identifier associated with A-SRS transmissions, that a second one or more A-SRS transmissions are not to be transmitted; and
means for transmitting a physical uplink control channel (PUCCH) transmission in accordance with the power control information based at least in part on determining that the second one or more A-SRS transmissions are not to be transmitted.

29. The apparatus of claim 28, further comprising:
means for refraining, based at least in part on the second identifier, from transmitting the second one or more A-SRS transmissions.

30. A non-transitory computer-readable medium storing code for wireless communication, the code comprising instructions executable by a processor to:

receive a resource assignment on a downlink (DL) component carrier (CC) in a carrier aggregation (CA) configuration, the resource assignment comprising an identifier associated with aperiodic sounding reference signal (A-SRS) transmissions on one or more uplink (UL) CCs outside the CA configuration used for UL data transmissions, an A-SRS trigger, and the resource assignment further comprising power control information for the A-SRS transmissions; and transmit the A-SRS transmissions on the one or more UL CCs in accordance with the power control information and the A-SRS trigger.

31. A method of wireless communication, comprising:

receiving a downlink control information (DCI) message comprising a sounding reference signal radio network temporary identifier (SRS-RNTI), an aperiodic sounding reference signal (A-SRS) request field, and a transmitter power control (TPC) command field; and transmitting A-SRS transmissions on one or more uplink (UL) component carriers (CCs) in accordance with the TPC command field and the SRS-RNTI, wherein the one or more UL CCs are configured to transmit A-SRS and are outside a carrier aggregation (CA) configuration used for UL data transmissions.

32. The method of claim 31, wherein not performing UL data transmissions comprises refraining from transmitting a physical uplink shared channel (PUSCH) on the one or more UL CCs.

33. An apparatus for wireless communication, comprising:

a processor;

memory coupled with the processor; and instructions stored in the memory and executable by the processor to cause the apparatus to:

receive a downlink control information (DCI) message comprising a sounding reference signal radio network temporary identifier (SRS-RNTI), an aperiodic sounding reference signal (A-SRS) request field, and a transmitter power control (TPC) command field; and transmit A-SRS transmissions on one or more uplink (UL) component carriers (CCs) in accordance with the TPC command field and the SRS-RNTI, wherein the one or more UL CCs are configured to transmit A-SRS and are outside a carrier aggregation (CA) configuration used for UL data transmissions.

34. The apparatus of claim 33, wherein not performing UL data transmissions comprises refraining from transmitting a physical uplink shared channel (PUSCH) on the one or more UL CCs.

35. An apparatus for wireless communication, comprising:

means for receiving a downlink control information (DCI) message comprising a sounding reference signal radio network temporary identifier (SRS-RNTI), an aperiodic sounding reference signal (A-SRS) request field, and a transmitter power control (TPC) command field; and means for transmitting A-SRS transmissions on one or more uplink (UL) component carriers (CCs) in accordance with the TPC command field and the SRS-RNTI, wherein the one or more UL CCs are configured to transmit A-SRS and are outside a carrier aggregation (CA) configuration used for UL data transmissions.

36. The apparatus of claim 35, wherein not performing UL data transmissions comprises refraining from transmitting a physical uplink shared channel (PUSCH) on the one or more UL CCs.

37. A non-transitory computer-readable medium storing code for wireless communication, the code comprising instructions executable by a processor to:

receive a downlink control information (DCI) message comprising a sounding reference signal radio network temporary identifier (SRS-RNTI), an aperiodic sounding reference signal (A-SRS) request field, and a transmitter power control (TPC) command field; and transmit A-SRS transmissions on one or more uplink (UL) component carriers (CCs) in accordance with the TPC command field and the SRS-RNTI, wherein the one or more UL CCs are configured to transmit A-SRS and are outside a carrier aggregation (CA) configuration used for UL data transmissions.

* * * * *